(12) United States Patent　　　(10) Patent No.:　US 12,619,843 B2

Groomes et al.　　　(45) Date of Patent:　May 5, 2026

(54) RFID-BASED POSITIONING SYSTEM FOR INDOOR ENVIRONMENTS

(71) Applicant: Target Brands, Inc., Minneapolis, MN (US)

(72) Inventors: David Groomes, Minneapolis, MN (US); Kalyan Manepalli, Minneapolis, MN (US); Tim Milne, Minneapolis, MN (US); Cameron Peickert, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 135 days.

(21) Appl. No.: 18/408,671

(22) Filed: Jan. 10, 2024

(65) Prior Publication Data

US 2025/0225349 A1　　Jul. 10, 2025

Related U.S. Application Data

(63) Continuation of application No. 17/573,377, filed on Jan. 11, 2022, now Pat. No. 11,907,798.

(Continued)

(51) Int. Cl.
　　*G06K 7/10*　　　(2006.01)
　　*G01C 21/00*　　　(2006.01)
　　　　　　(Continued)

(52) U.S. Cl.
　　CPC ....... *G06K 7/10386* (2013.01); *G01C 21/383* (2020.08); *G01S 13/751* (2013.01); *G06K 7/10366* (2013.01); *G06Q 10/087* (2013.01)

(58) Field of Classification Search
　　CPC ........... G06K 7/10386; G06K 7/10366; G06K 17/00; G01C 21/383; G01S 13/751; G06Q 10/087
　　See application file for complete search history.

(56) References Cited

U.S. PATENT DOCUMENTS

| | | | |
|---|---|---|---|
| 7,271,702 B2* | 9/2007 | Patil | ....................... G06Q 10/08 |
| | | | 340/5.5 |
| 7,633,392 B2* | 12/2009 | Neuwirth | ............. G06Q 10/087 |
| | | | 340/572.1 |

(Continued)

FOREIGN PATENT DOCUMENTS

EP　　　　2806384　　　11/2014

OTHER PUBLICATIONS

Asset Vue, "Manage Your Data Center Assets Fast. Easy. Accurate. Powerful," Asset Vue, Strategic Data Center Vision, 2 pages.

(Continued)

*Primary Examiner* — Steven S Paik
*Assistant Examiner* — Asifa Habib
(74) *Attorney, Agent, or Firm* — Barnes & Thornburg LLP

(57)　　　　　　ABSTRACT

Particular embodiments described herein include an apparatus for providing RFID-based locations for items located in an indoor environment including an RFID scanner to transmit interrogating RFID signals and to receive RFID identifiers for RFID tags, the RFID tags being affixed to the items in the indoor environment. The apparatus can additionally include an indoor location tracking device to determine a current location of the apparatus within the indoor environment, wherein the apparatus is mobile and configured to be moved throughout the indoor environment. The apparatus can further include an RFID-location processor to receive RFID data from the RFID scanner and location data from the indoor location tracking device, correlate portions of the RFID data with portions of the location data, and generate RFID-based location data for the items located in the indoor environment based, at least in part, on the correlated portions of the RFID data and the location data.

20 Claims, 12 Drawing Sheets

Related U.S. Application Data

(60) Provisional application No. 63/143,262, filed on Jan. 29, 2021.

(51) Int. Cl.
*G01S 13/75* (2006.01)
*G06Q 10/087* (2023.01)

(56) References Cited

U.S. PATENT DOCUMENTS

| | | | |
|---|---|---|---|
| 7,904,244 B2 | 3/2011 | Sugla | |
| 9,134,398 B2 * | 9/2015 | Dupray | G01S 5/0009 |
| 9,583,121 B2 * | 2/2017 | Kalampoukas | H04W 4/021 |
| 9,940,491 B2 | 4/2018 | Lim et al. | |
| 10,217,340 B2 | 2/2019 | Lerner | |
| 10,586,082 B1 * | 3/2020 | Tang | G01S 13/75 |
| 2007/0018820 A1 * | 1/2007 | Chand | G01S 19/48 |
| | | | 340/572.1 |
| 2007/0247366 A1 * | 10/2007 | Smith | H04W 4/029 |
| | | | 342/464 |
| 2009/0231135 A1 * | 9/2009 | Chaves | G06Q 10/087 |
| | | | 340/572.1 |
| 2014/0304107 A1 * | 10/2014 | McAllister | G06K 7/10376 |
| | | | 705/26.7 |
| 2015/0106403 A1 * | 4/2015 | Haverinen | G06F 16/288 |
| | | | 707/792 |
| 2015/0204649 A1 * | 7/2015 | McFarthing | G01S 19/48 |
| | | | 342/357.43 |
| 2016/0110788 A1 * | 4/2016 | Stephenson | G06Q 10/087 |
| | | | 705/7.29 |
| 2017/0092090 A1 * | 3/2017 | Lerner | G08B 13/2462 |
| 2018/0039934 A1 * | 2/2018 | Mulaosmanovic | G06Q 10/08 |
| 2020/0074371 A1 | 3/2020 | Bogolea | |
| 2020/0184416 A1 * | 6/2020 | Javaheri | G06K 7/1417 |
| 2020/0271749 A1 * | 8/2020 | Wu | G01S 5/0278 |
| 2021/0158051 A1 * | 5/2021 | Dalal | G06T 7/246 |
| 2021/0398059 A1 * | 12/2021 | Gravelle | G06F 16/23 |
| 2022/0058578 A1 * | 2/2022 | Javaheri | G06Q 10/0838 |
| 2022/0245369 A1 * | 8/2022 | Groomes | G06Q 10/087 |
| 2023/0014580 A1 * | 1/2023 | Zhu | G01C 21/3867 |
| 2023/0020685 A1 * | 1/2023 | Bizoara | G06Q 10/087 |
| 2023/0237431 A1 * | 7/2023 | Glaser | H04W 4/029 |
| | | | 705/28 |
| 2024/0144354 A1 * | 5/2024 | Glaser | G06Q 10/087 |
| 2024/0211875 A1 * | 6/2024 | Dillon | H04W 4/80 |
| 2025/0232629 A1 * | 7/2025 | Meadow | G07C 9/29 |

OTHER PUBLICATIONS

"Bouzakis & Overmeyer, ""Position Tracking for Passive UHF RFID Tagswith the Aid of a Scanned Array,"" International Journal of Wireless Information Networks, Dec. 2013, 20(4):318-327".

Shangguan et al., "Relative Localization of RFID Tags using Spatial-Temporal Phase Profiling," Presented at the Proceedings of the 12th USENIX Symposium on Networked Systems Design and Implementation (NSDI '15), May 4-6, 2015, Oakland, CA, USA, 14 pages.

"Shen et al., ""ANTspin: Efficient Absolute Localization Method ofRFID Tags via Spinning Antenna,"" Sensors, Jan. 2019, 19(9):2194, 20 pages".

* cited by examiner

400

500

Receive RFID Data    _502_

Receive Location Data    _504_

Identify Timestamps for RFID Data and Location Data    _506_

Determine Correlation Between Timestamps    _508_

Pair RFID Data and Location Data Instances Based on Timestamps and Correlation    _510_

Generate and Output RFID-Location Data    _512_

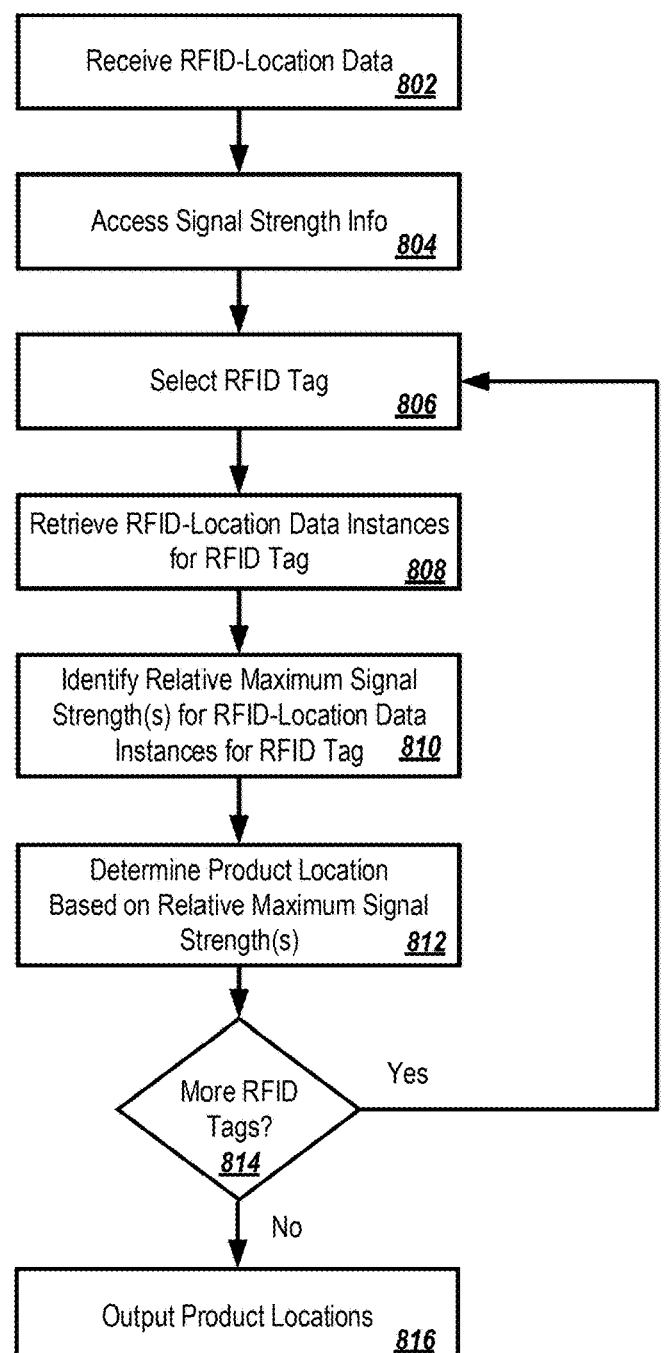
FIG. 8

| RFID Tag | Location | RSSI | Location Confidence |
|---|---|---|---|
| Tag_A | 10, 20 | -50 dBm | 0.5 |
| Tag_B | 10, 20 | -10 dBm | 0.25 |
| Tag_A | 11, 20 | -45 dBm | 0.7 |
| Tag_B | 11, 20 | -20 dBm | 0.9 |
| Tag_A | 12, 20 | -40 dBm | 0.88 |
| Tag_B | 12, 20 | -15 dBm | 0.3 |
| Tag_A | 13, 20 | -45 dBm | 0.7 |
| Tag_B | 13, 20 | -20 dBm | 0.4 |
| Tag_A | 14, 20 | -50 dBm | 0.5 |
| Tag_B | 14, 20 | -30 dBm | 0.5 |
| Tag_A | 15, 20 | -60 dBm | 0.2 |
| Tag_B | 15, 20 | -35 dBm | 0.2 |

1000

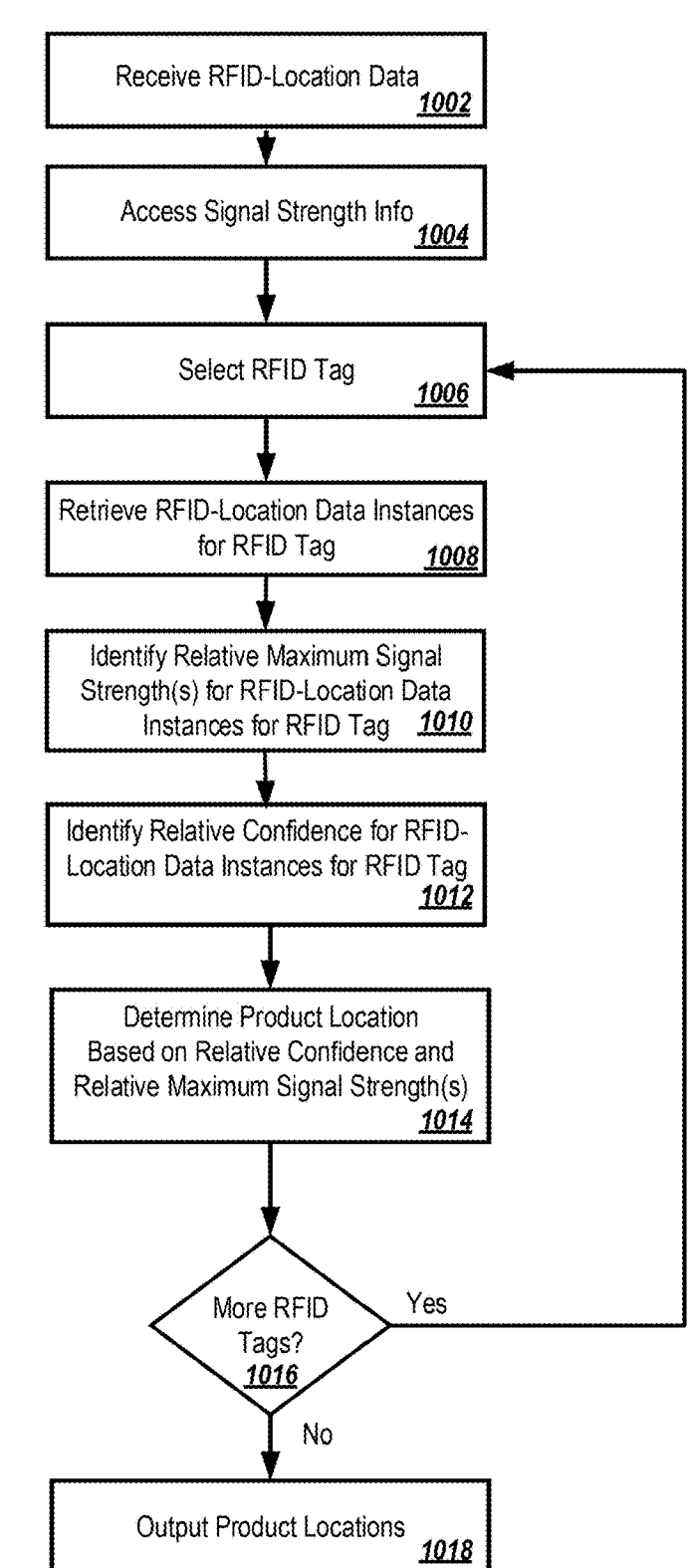

Receive RFID-Location Data
_1002_

Access Signal Strength Info
_1004_

Select RFID Tag
_1006_

Retrieve RFID-Location Data Instances
for RFID Tag
_1008_

Identify Relative Maximum Signal
Strength(s) for RFID-Location Data
Instances for RFID Tag    _1010_

Identify Relative Confidence for RFID-
Location Data Instances for RFID Tag
_1012_

Determine Product Location
Based on Relative Confidence and
Relative Maximum Signal Strength(s)
_1014_

More RFID
Tags?
_1016_

Yes

No

Output Product Locations
_1018_

FIG. 10

RFID-BASED POSITIONING SYSTEM FOR INDOOR ENVIRONMENTS

CROSS REFERENCE TO RELATED APPLICATIONS

This application is a continuation of U.S. patent application Ser. No. 17/573,377, filed Jan. 11, 2022, which claims the benefit of priority of U.S. Provisional Application No. 63/143,262, which applications are incorporated herein by reference in their entirety.

TECHNICAL FIELD

This document generally describes technology for providing positioning information within indoor environments using RFID scans, such as providing product location information within a retail store (example indoor environment).

BACKGROUND

Radio-frequency identification (RFID) uses electromagnetic fields to automatically identify and track tags attached to objects ("RFID tags"). An RFID tag can include a small radio transponder with a radio receiver and transmitter. When triggered by an electromagnetic interrogation pulse from a nearby RFID reader device, the RFID tag can transmit digital data, such as an identification number encoded within the RFID tag, back to the reader. The reader can receive and interpret this digital data, such as recording the identification number encoded within the RFID tag.

Two general types of RFID tags have been developed-passive RFID tags and active RFID tags. Passive RFID tags are powered by energy from the RFID reader's interrogating radio waves and, in response to being powered by the interrogating radio waves, reflect the encoded digital data back to the reader. Active RFID tags are powered by a battery (or other onboard power source), which can extend the range over which they are able to interact with an RFID reader (e.g., range of up to hundreds of meters). Unlike barcodes and other optically read encodings (e.g., QR codes), RFID tags can be read without line of sight between the RFID tag and the reader.

SUMMARY

The technology disclosed in this document generally relates to determining accurate locations for items with RFID tags in indoor environments (e.g., retail store, warehouse, stock room) through the use of an indoor positioning system. For example, the disclosed technology can provide mechanisms to more accurately, quickly, and robustly identify and determine the locations of RFID-tagged items, such as consumer products, within an interior environment, such as retail stores.

Achieving these outcomes (accurate, robust, and quick identification of item location in interior space) has been challenging with traditional options. For example, manual inventory checks, which can involve workers physically counting inventory items that are currently on shelves in a store and recording those tallies with an inventory management system, are labor and time intensive. As a result, manual inventory checks may be performed with only a limited frequency (e.g., once per day, once per week), which may create inconsistency between the inventory that is actually on store shelves and that which is reflected in electronic records for an inventory management system. In another example, active RFID tags have been used to provide anti-theft features for higher value items within a store, but those active RFID tags are more expensive to implement and not cost effective to deploy across large swaths of products within a retail store. Similarly, "smart shelving" that includes sensors and tracking devices to detect the presence of items on a shelf can provide better real time inventory information, but they come at a significant expense to implement these features across some or all shelves in a retail store, they may not be possible in all product environments (e.g., may not be possible for refrigerated and/or frozen goods), and they may not be able to readily differentiate between products intended for a shelf and other products misplaced on a shelf.

The disclosed technology provides a better solution to identify the location of physical items with passive RFID tags within an indoor environment, such as a retail store, by accurately correlating indoor positioning data with RFID scan data. For example, indoor positioning systems, such as wireless beacon systems and/or light-based positioning systems (e.g., Acuity's Atrius Navigator system), can include an infrastructure of transmitters and/or receivers within the indoor environment that interact with a mobile device (e.g., handheld device) to provide the location of the mobile device within an indoor environment. Such a mobile device can additionally include (and/or be paired with) an RFID scanner to contemporaneously generate location data and RFID data, which can be correlated with each other to provide RFID-based location information, which can be used to determine the location of products (correlated with individual RFID tags) within an interior space. Such RFID-based location information for items can be more easily and quickly generated, for example, by simply having a worker traverse aisles in a store with such a mobile device (or other apparatus), which can be performed frequently than manual inventory counts. Additionally, such RFID-based location information for items can provide a more robust and inexpensive solution than, for instance, smart shelves because a single mobile device can generate inventory information for an entire indoor space, instead of separate devices located on each shelf within a store. Similarly, the disclosed technology can accurately identify items and their locations regardless of whether they are located on the correct shelf (e.g., misplaced inventory), and such information can be used to retrieve and relocate improperly shelved inventory.

The disclosed technology can provide to solve a variety of technical problems associated with merging RFID and location data together and, as a result, can provide a more robust and comprehensive solution. For example, RFID and location data may be produced at different temporal frequencies and with different timestamps, which can present hurdles to accurately correlating RFID scans with location information. The disclosed technology can solve this (and other) problems to provide a solution that accurately correlates RFID scans with location data so that the locations for RFID scans are accurately determined within an indoor environment.

In another example, RFID scan ranges for passive RFID tags—meaning the distance from which an RFID scanner is able to receive a response from an RFID tag through an interrogating radio wave—can vary from a few feet to well over 30 feet depending on the RFID tag technology (e.g., low frequency RFID, high frequency RFID, ultra-high frequency RFID). As a result, depending on the frequency with which RFID interrogating waves are transmitted by an RFID scanner and the speed at which an RFID scanner is moving throughout an indoor space, each RFID tag may register multiple different locations. For example, if an RFID scanner transmits interrogating pulses every 0.1 seconds, the range for RFID tags used within an indoor environment is 3 feet, and the scanner is moving 1.5 feet every second, then each RFID tag may register upwards of 20 different RFID scans and corresponding locations (e.g., (3 ft/1.5 ft/sec)/0.1 scan/sec=20 scans). This assumes that the RFID scans are only performed in front of the reader, which is the case with some RFID readers. However, in the case of an RFID scanner that reads all RFID tags within, for example, a 3 foot radius of the reader would have a 6 foot range (ranging from 3 feet in front of the reader to 3 feet behind the reader) and would effectively double the number of RFID scans for each tag to 40 (e.g., (6 ft/1.5 ft/sec)/0.1 scan/sec=40 scans). As a result, the multitude of RFID scans can result in uncertainty regarding the location of the RFID tag. The disclosed technology can be used to determine and identify an appropriate location for the RFID tag in such situations to provide a more accurate RFID-based location within an interior environment, such as through the use of the receive power levels for RFID signals (e.g., received signal strength indicator (RSSI)) received from RFID tags.

Furthermore, the disclosed technology can accommodate for variation in RFID transmission strength. For example, environmental factors can significantly impact the RSSI for signals transmitted by RFID tags, such as nearby or adjacent physical objects that may be in contact with or otherwise blocking the RFID tag's transmission of a wireless signal. Additionally, variation in RFID tags and the items to which they are affixed may additionally affect RFID tag transmission power. As a result, correlating RFID tags to locations based on absolute RFID power levels (e.g., RSSI) may not provide an accurate indication of location or proximity. The disclosed technology resolves these issues, for example, by using relative RFID power levels for individual tags as they are provided in series in order to establish transmission power baselines against which the locations for the RFID scans for a tag can be evaluated.

Particular embodiments described herein include an apparatus for providing RFID-based locations for items located in an indoor environment, the apparatus including an RFID scanner configured to transmit interrogating RFID signals and to receive RFID identifiers for RFID tags that are within range of the RFID scanner, wherein the RFID tags are affixed to the items located in the indoor environment. The apparatus can additionally include an indoor location tracking device configured to interact with an indoor positioning system to determine a current location of the apparatus within the indoor environment, wherein the apparatus is mobile and configured to be moved throughout the indoor environment. The apparatus can further include an RFID-location processor configured to (i) receive RFID data from the RFID scanner and location data from the indoor location tracking device, (ii) correlate portions of the RFID data with portions of the location data, and (iii) generate RFID-based location data for the items located in the indoor environment based, at least in part, on the correlated portions of the RFID data and the location data.

Such an apparatus can optionally include one or more of the following features. The RFID data can include a time series of the RFID identifiers detected by the RFID scanner with corresponding RFID timestamps identifying times at which the RFID scanner detected each of the RFID identifiers. The location data can include a time series of the current location for the apparatus with corresponding location timestamps identifying times at which the indoor location tracking device determined each of the current locations. Correlating portions of the RFID data with the portions of the location data can include determining a correlation between the RFID timestamps and the location timestamps; and pairing the portions of the RFID data and the portions of the location data based on the correlation. In instances where a frequency for the RFID data is less than a frequency for the location data, the pairing can include identifying groups of the location data that correspond to individual instances in the RFID data; determining combined locations for each of the groups of location data; and pairing the combined locations with the individual instances of the RFID data. The combined locations for each of the groups of location data can include an average of locations contained within each of the groups. The combined locations for each of the groups of location data can include a median of locations contained within each of the groups. The combined locations for each of the groups of location data can include a mode of locations contained within each of the groups. In instances where a frequency for the RFID data is greater than a frequency for the location data, the pairing can include identifying groups of the RFID data that correspond to individual instances in the location data; consolidating each of the groups of RFID data to a singular instance of RFID data; and pairing each of the consolidated groups of RFID data with individual instances of the location data.

Generating the RFID-based location data for the items located in the indoor environment can include accessing signal strength information for the RFID data; and for each RFID tag, selecting one or more correlated RFID and location data records having a maximum signal strength among all correlated RFID and location data records for the RFID tag; and determining a location for the RFID tag based, at least in part, on the selected one data records. The RFID scanner can further be configured to detect the signal strength information and to include the signal strength information as part of the RFID data. When multiple data records from the correlated RFID and location data records has the maximum signal strength or is within a threshold value of the maximum signal strength, the location for the RFID tag can be determined based on a combination of locations from the multiple data records. The combination of locations from the multiple data records can include an average of the locations from the multiple data records. The combination of locations from the multiple data records can include a centroid of the locations from the multiple data records. The combination of locations from the multiple data records can include a weighted average of the locations from the multiple data records, where the locations are weighted based on corresponding signal strengths for the records.

In some implementations, a method for providing RFID-based locations for items located in an indoor environment includes transmitting, by an RFID scanner that is part of an apparatus, interrogating RFID signals; receiving, by the RFID scanner, RFID identifiers for RFID tags that are within range of the RFID scanner, wherein the RFID tags are affixed to the items located in the indoor environment; determining, by an indoor location tracking device that is also part of the apparatus, a current location of the apparatus within the indoor environment based on interactions between the indoor tracking device and an indoor positioning system, wherein the apparatus is mobile and configured to be moved throughout the indoor environment; and generating, by an RFID-location processor that is also part of the apparatus, RFID-based location data for the items located in the indoor environment, wherein the generating includes: receiving, by the RFID-location processor, RFID data from the RFID scanner and location data from the indoor location tracking device, correlating, by the RFID-location processor, portions of the RFID data with portions of the location data, and generating, by the RFID-location processor, the RFID-based location data for the items located in the indoor environment based, at least in part, on the correlated portions of the RFID data and the location data.

Such a method can optionally include one or more of the following features. The RFID data can include a time series of the RFID identifiers detected by the RFID scanner with corresponding RFID timestamps identifying times at which the RFID scanner detected each of the RFID identifiers. The location data can include a time series of the current location for the apparatus with corresponding location timestamps identifying times at which the indoor location tracking device determined each of the current locations. Correlating portions of the RFID data with the portions of the location data can include determining a correlation between the RFID timestamps and the location timestamps; and pairing the portions of the RFID data and the portions of the location data based on the correlation. In instances where a frequency for the RFID data is less than a frequency for the location data, the pairing can include identifying groups of the location data that correspond to individual instances in the RFID data; determining combined locations for each of the groups of location data; and pairing the combined locations with the individual instances of the RFID data. The combined locations for each of the groups of location data can include an average of locations contained within each of the groups. The combined locations for each of the groups of location data can include a median of locations contained within each of the groups. The combined locations for each of the groups of location data can include a mode of locations contained within each of the groups. In instances where a frequency for the RFID data is greater than a frequency for the location data, the pairing can include identifying groups of the RFID data that correspond to individual instances in the location data; consolidating each of the groups of RFID data to a singular instance of RFID data; and pairing each of the consolidated groups of RFID data with individual instances of the location data.

Generating the RFID-based location data for the items located in the indoor environment can include accessing signal strength information for the RFID data; and for each RFID tag, selecting one or more correlated RFID and location data records having a maximum signal strength among all correlated RFID and location data records for the RFID tag; and determining a location for the RFID tag based, at least in part, on the selected one data records. The RFID scanner can further be configured to detect the signal strength information and to include the signal strength information as part of the RFID data. When multiple data records from the correlated RFID and location data records has the maximum signal strength or is within a threshold value of the maximum signal strength, the location for the RFID tag can be determined based on a combination of locations from the multiple data records. The combination of locations from the multiple data records can include an average of the locations from the multiple data records. The combination of locations from the multiple data records can include a centroid of the locations from the multiple data records. The combination of locations from the multiple data records can include a weighted average of the locations from the multiple data records, where the locations are weighted based on corresponding signal strengths for the records.

Particular embodiments described herein can include an apparatus for providing RFID-based locations for items located in an indoor environment, the apparatus can have an RFID scanner that can transmit interrogating RFID signals and receive RFID identifiers for RFID tags that are within range of the RFID scanner, the RFID tags being affixed to the items located in the indoor environment, an indoor location tracking device that can interact with an indoor positioning system to determine a current location of the apparatus within the indoor environment, the apparatus being mobile and able to be moved throughout the indoor environment, and an RFID-location processor that can (i) receive RFID data from the RFID scanner and location data from the indoor location tracking device, (ii) correlate portions of the RFID data with portions of the location data, and (iii) generate RFID-based location data for the items located in the indoor environment based, at least in part, on the correlated portions of the RFID data and the location data.

Such an apparatus can optionally include one or more of the following features. The RFID data can include a time series of the RFID identifiers detected by the RFID scanner with corresponding RFID timestamps identifying times at which the RFID scanner detected each of the RFID identifiers, and the location data can include a time series of the current location for the apparatus with corresponding location timestamps identifying times at which the indoor location tracking device determined each of the current locations. Correlating portions of the RFID data with the portions of the location data can include determining a correlation between the RFID timestamps and the location timestamps and pairing the portions of the RFID data and the portions of the location data based on the correlation. In instances where a frequency for the RFID data is less than a frequency for the location data, the pairing can include identifying groups of the location data that correspond to individual instances in the RFID data, determining combined locations for each of the groups of location data, and pairing the combined locations with the individual instances of the RFID data. The combined locations for each of the groups of location data can include an average of locations contained within each of the groups. The combined locations for each of the groups of location data can include a median of locations contained within each of the groups. The combined locations for each of the groups of location data can include a mode of locations contained within each of the groups. In instances where a frequency for the RFID data is greater than a frequency for the location data, the pairing can include identifying groups of the RFID data that correspond to individual instances in the location data, consolidating each of the groups of RFID data to a singular instance of RFID data, and pairing each of the consolidated groups of RFID data with individual instances of the location data.

As another example, generating the RFID-based location data for the items located in the indoor environment can include accessing signal strength information for the RFID data, for each RFID tag, selecting one or more correlated RFID and location data records having a maximum signal strength among all correlated RFID and location data records for the RFID tag, and determining a location for the RFID tag based, at least in part, on the selected one data records. The RFID scanner can also detect the signal strength information and include the signal strength information as part of the RFID data. When multiple data records from the correlated RFID and location data records has the maximum signal strength or is within a threshold value of the maximum signal strength, the location for the RFID tag can be determined based on a combination of locations from the multiple data records. The combination of locations from the multiple data records can include an average of the locations from the multiple data records. The combination of locations from the multiple data records can include a centroid of the locations from the multiple data records. The combination of locations from the multiple data records can include a weighted average of the locations from the multiple data records, where the locations can be weighted based on corresponding signal strengths for the records.

In some implementations, generating the RFID-based location data for the items located in the indoor environment can include accessing signal strength information for the RFID data, accessing location confidence values for the location data, for each RFID tag, selecting one or more correlated RFID and location data records having a relative maximum signal strength and relative maximum location confidence value among all correlated RFID and location data records for the RFID tag, and determining a location for the RFID tag based, at least in part, on the selected one or more correlated RFID and location data records. The relative maximum location confidence value can exceed a threshold confidence range. The indoor location tracking device can detect the location confidence values and include the location confidence values as part of the location data.

Moreover, the indoor environment can include buffers between first locations and second locations in the indoor environment, the first locations including a sales floor and the second locations including stock rooms. The RFID-location processor can also discard at least one of the RFID data and the location data based on a determination that the at least one RFID data and the location data is associated with a location in the indoor environment that includes at least a portion of the buffers.

Particular embodiments described herein can also include a method for providing RFID-based locations for items located in an indoor environment, the method including: transmitting, by an RFID scanner that is part of an apparatus, interrogating RFID signals, receiving, by the RFID scanner, RFID identifiers for RFID tags that are within range of the RFID scanner, the RFID tags being affixed to the items located in the indoor environment, determining, by an indoor location tracking device that is also part of the apparatus, a current location of the apparatus within the indoor environment based on interactions between the indoor tracking device and an indoor positioning system, the apparatus being mobile and able to be moved throughout the indoor environment, and generating, by an RFID-location processor that is also part of the apparatus, RFID-based location data for the items located in the indoor environment. The generating can include receiving, by the RFID-location processor, RFID data from the RFID scanner and location data from the indoor location tracking device, correlating, by the RFID-location processor, portions of the RFID data with portions of the location data, and generating, by the RFID-location processor, the RFID-based location data for the items located in the indoor environment based, at least in part, on the correlated portions of the RFID data and the location data.

The devices, system, and techniques described herein may provide one or more of the following advantages. For example, as described above, the disclosed technology can provide a more accurate, robust, cost effective, and efficient mechanism to identify the location of RFID-tagged items in interior environments. Such improved location determination for RFID-tagged items can provide a variety of associated benefits, such as providing more accurate and up-to-date inventory tracking within a retail store, including accounting for and locating misplaced inventory that is located in portions of a retail store other than their designated location (e.g., picked up by customer from designated shelf and placed in other portion of store, shelved in incorrect location of retail store).

In another example, similar to helping locate misplaced inventory, the location-tracking provided by the disclosed technology can help locate items not tied to specific locations, like apparel items that could be anywhere on a large sales floor pad. This can help employees pinpoint these items quickly, for example, when fulfilling online orders.

The details of one or more implementations are set forth in the accompanying drawings and the description below. Other features and advantages will be apparent from the description and drawings, and from the claims.

BRIEF DESCRIPTION OF THE DRAWINGS

FIG. 8 is a flowchart of an example technique for refining RFID-location data based on RFID signal strength.

FIG. 10 is a flowchart of an example technique for refining RFID-location data based on RFID signal strength and location confidence.

DETAILED DESCRIPTION OF ILLUSTRATIVE EMBODIMENTS

Figure 1:
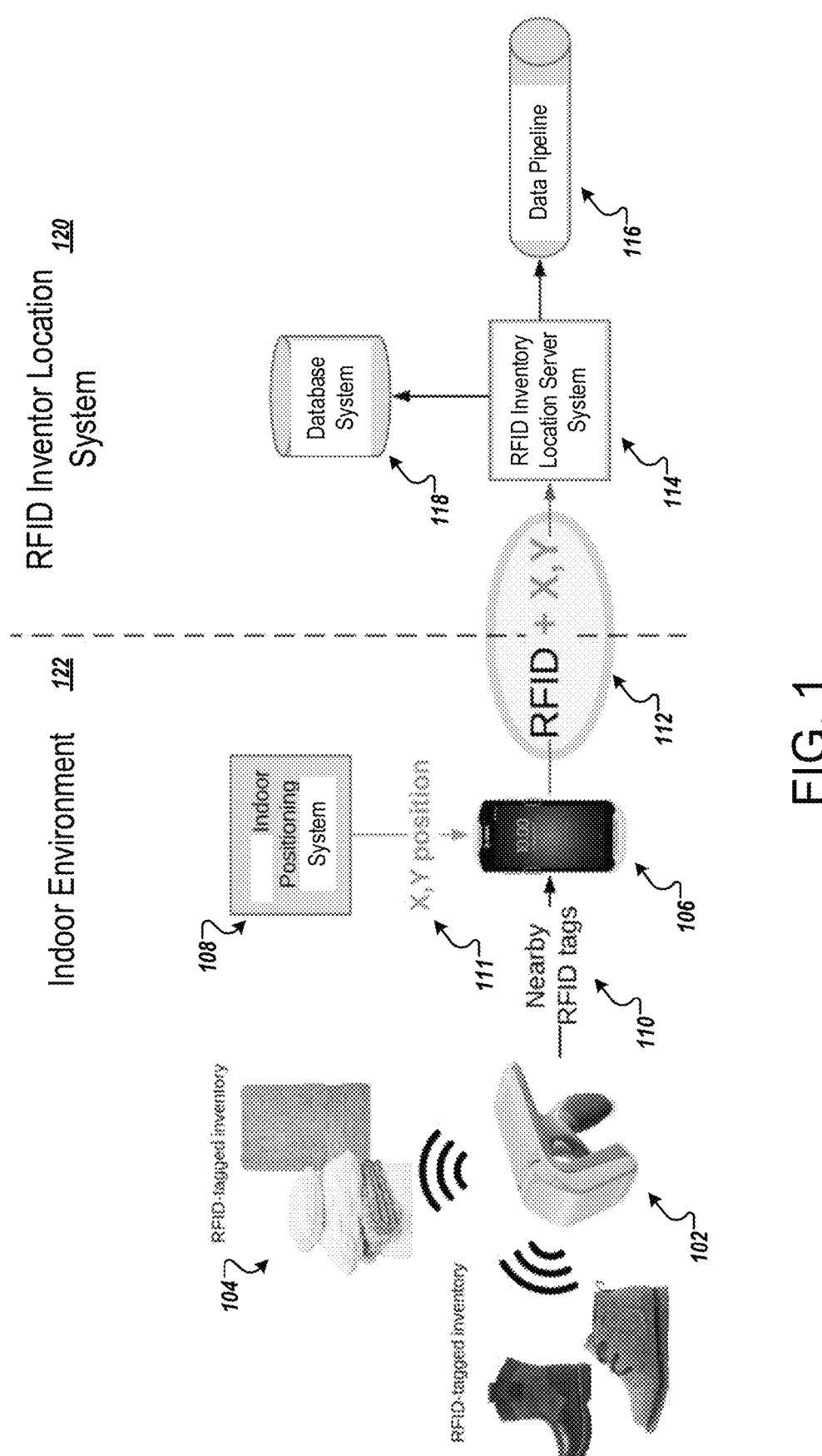
FIG. 1 is a conceptual diagram of an example system for providing RFID-based location tracking for items in an indoor environment.

FIG. 1 is a conceptual diagram of an example system 100 for providing RFID-based location tracking for items in an indoor environment, such as tracking inventory (example RFID-tagged item) within a retail store (example indoor environment).

The example system 100 includes an indoor environment 122, such as a retail store, a warehouse, a stock room, and/or other indoor environments, with an indoor positioning system 108. The indoor positioning system 108 can be any of a variety of positioning systems that are designed to aid in determining the location of a mobile computing device 106. The indoor positioning system 108 can, for example, use an array of wireless beacon devices that are physically positioned around the indoor environment 122 and which transmit near to short range wireless signals (e.g., Bluetooth low energy (BLE)) that, based on which signals are detected and the strength of those detected signals by the mobile computing device 106, aid in determining the location of the mobile computing device 106. In another example, the indoor positioning system 108 can include an array of wireless receivers that are positioned around the indoor environment 122 that detect beacon signals transmitted by the mobile computing device 106 and, based on the which receivers detect those beacon signals and the strength of those signals, can determine the location of the mobile computing device 106. In another example, the indoor positioning system 108 can encode unique location information in light that is transmitted by specialized light bulbs positioned around the indoor environment 122, which can be detected by a camera on the mobile computing device 106 that is programmed to decode the location information and, from that decoded information, determine the location of the mobile computing device 106. Combinations of these and/or other indoor positioning systems are also possible.

The system 100 also includes an RFID scanner device 102 that is configured to transmit interrogating RFID signals that are received by and reflected back with RFID identifiers by RFID-tagged inventory 104, such as products that are for sale in a retail store, products that are stored in a warehouse, products that are stored in a stockroom, and/or other items with RFID tags. The inventory 104 can each include a corresponding passive RFID tag that, when the RFID scanner device 102 transmits an interrogating RFID signal, is configured to transmit a unique identifier encoded within the RFID tag that is associated with the inventory item. For example, each item of inventory 104 can have different RFID tag with a different unique identifier that is transmitted to the RFID scanner 102 in response to the interrogation signal. For example, if a shelf includes ten toothbrushes that are the same make and model, each of the ten toothbrushes can have a different RFID tag with a different unique identifier that is associated with an instance of the toothbrush in an RFID-product database system correlating RFID tag identifiers to products. When that shelf is interrogated by the RFID scanner 102, each of the ten RFID tags can transmit its corresponding unique identifier, which can be received by the RFID scanner 102 and correlated with the make and model of toothbrush using the RFID-product database.

The RFID tag identifiers 110 provided by the RFID scanner 102 can be combined with location information 111 for the mobile device 106 (which may be determined locally by the mobile device 106, remotely by the indoor positioning system 108 and/or other remote systems, and/or through a combination of processing by the mobile device 106 and the indoor positioning system 108) to provide location RFID-based location information 112 for the inventory items 104. The RFID scanner 102 and the mobile device 106 can be part of the same apparatus (e.g., single housing containing both components for RFID scanner 102 and mobile device 106), separate apparatuses that are positioned near each other (e.g., separate devices that are attached/affixed to each other, and/or that are attached/affixed to a common apparatus, such as a cart or other movable apparatus), and/or other arrangements that permit for the RFID data 110 and location data 111 to be correlated with each other. As described in greater detail below with regard to FIGS. 2 and 5-8, the RFID-based location information 112 can be further refined to identify a specific location for each RFID-tag (in spite of each RFID tag potentially appearing in multiple scans) and can be correlated to other information linking the RFID-based location information 112 to specific items, such as products. For example, the RFID-based location information 112 can be used to determine a quantity of products in a retail store and, additionally, to determine whether those products are located in their intended locations in the retail store (e.g., located in intended location under a planogram for a retail store). The RFID-based location information 112 can further be used to locate and reshelf misplaced products within the store. Other uses for the RFID-based location information 112 are also possible.

The RFID-based location information 112 can be provided from the mobile device 106 to an RFID inventory location system 120, which can include an RFID location server system 114, a database system 118, and a data pipeline 116. The RFID location server system 114 can be any of a variety of server systems, such as cloud based server system, and can store the RFID-based location information 112 received over one or more networks from the mobile device 106 in the database system 118 and can publish the information as part of a data pipeline 116 (e.g., publish as Kafka topic) that other systems may subscribe to and access. Since the RFID-tagged inventory 104 in the indoor environment 122 may change over time (e.g., customers purchase inventory items that are subsequently replenished), the information 112 can be stored in the database 118 and published in the data pipeline 116 with corresponding timestamps that identify the time at which the locations identified in the location information 112 for the RFID-tagged inventory 104 was observed. The mobile device 106 may provide the location information 112 in real time or near real time to the RFID location server system 114, which can provide for real time or near real time assessments of inventory levels and product locations within the indoor environment 122.

Although the system 100 depicted in in FIG. 1, and described throughout this document, is described primarily with regard to use within indoor environments, this technology can also be used in outdoor environments that include positioning systems that are able to provide accurate location information (e.g., accurate location determination with accuracy ranging from inches to a couple feet).

Figure 2:
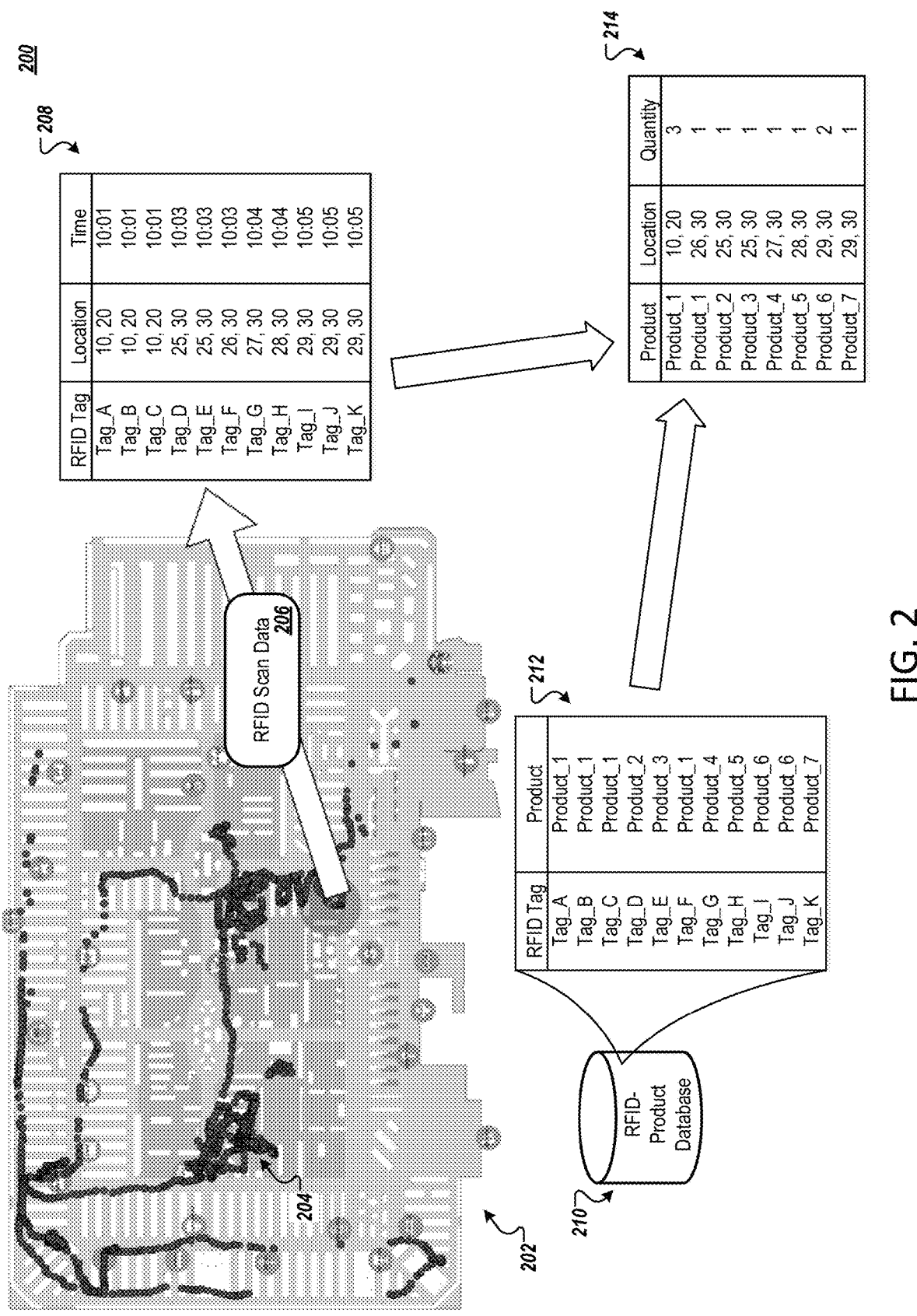
FIG. 2 is a conceptual diagram of an example system for correlating RFID-based location information with product information to provide RFID-based product locations.

FIG. 2 is a conceptual diagram of an example system 200 for correlating RFID-based location information with product information to provide RFID-based product locations. The example system 200 can be similar to the system 100, and can be implemented by some, all, and/or other components described above with regard to FIG. 1.

The system 200 depicts a physical indoor environment that, in this example, is a retail store 202 that includes a variety of RFID-tagged items located within the store 202. An RFID-based location scanner traverses a portion of the store 202, with each of the dots 204 identifying locations within the store 202 at which location-correlated RFID scans were performed to generate RFID scan data 206. Table 208 provides a simplistic view of the RFID scan data 206, which effectively correlates the scan RFID tag with a location in the store 202 at a particular time. The location can be represented using any of a variety of coordinate systems, such as an x, y coordinate system that transposes an x, y grid on the store 202 and correlates locations in the store to x, y positions in that grid. The example data depicted in table 208 is more simplistic than would be actually be generated scanning in a retail store 202 with RFID-tagged products, and is provided for illustrative purposes.

The system 200 further includes a database 210 that correlates RFID tags to products. As shown in the table 212, each RFID can be correlated to particular product (e.g., product SKU), which itself may be associated with a variety information for particular retailers (e.g., DCPI, TCIN). As show in the table 212, multiple RFID tags can be associated with the same product, such as Tag_A, Tag_B, Tag_C, and Tag_F all being associated with Product_1. These RFID tags can each be attached or affixed to different instances of the same product in the store 202.

The RFID scan data 206 can be correlated with the product information 210 to determine location of products in store 202, as depicted in the example table 214. This product location information can have a variety of uses, such as determining the current inventory of particular products in the physical store 202, which can be compared against and used to update electronic inventory records. In another example, the product location information can be used to determine a product map for the store 202, which may change over time. In another example, the product location information may be used to identify misplaced inventory in the store 202, such as the one instance of Product_1 that is at an outlier location in the store (26, 30) relative to the other instances of Product_1 (quantity of 3 located at 10, 20).

Figure 3:
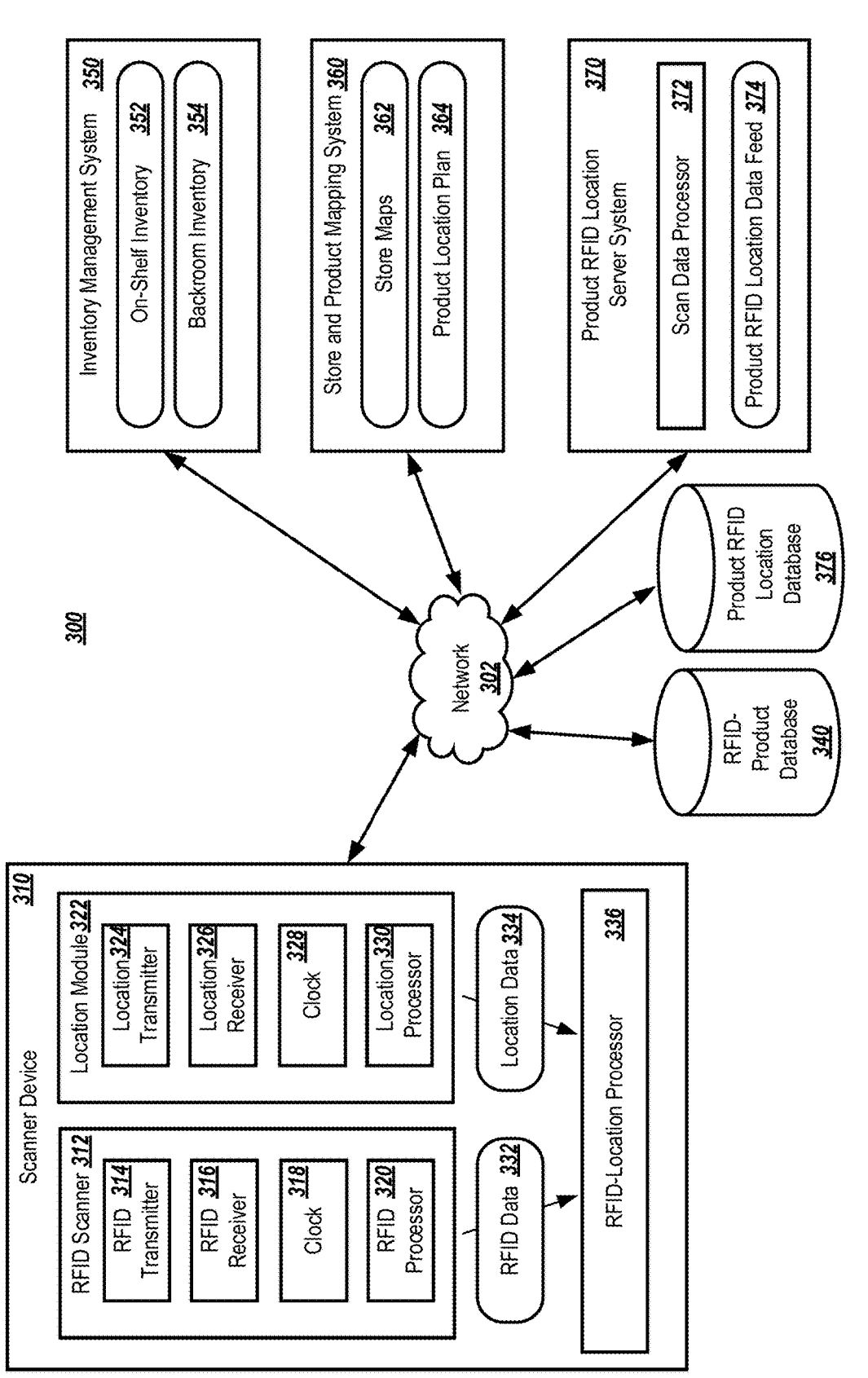
FIG. 3 is a diagram of an example system for determining and providing RFID-based location information.

FIG. 3 is a diagram of an example system 300 for determining and providing RFID-based location information. The example system 300 can be similar to the systems 100 and 200 described above with regard to FIGS. 1 and 2. The system 300 includes a scanner device 310 with an RFID scanner 312 and a location module 332. The RFID scanner 312 can be similar to the RFID scanner 102 described above with regard to FIG. 1, and the location module 332 can be similar to the mobile device 106 described above with regard to FIG. 1.

The RFID scanner 312 includes an RFID transmitter 314 that generates and transmits interrogating RFID signals that are received by and cause RFID tags to transmit their encoded identifiers, which are received by an RFID receiver 316. The RFID scanner 312 includes a clock 318 that is used to determine the timing for the RFID transmitter 314 and the RFID receiver 316, including the frequency with which interrogating pulses are transmitted and RFID signals are received by the RFID scanner 312. The RFID scanner 312 further includes one or more RFID processors 320 that are configured to control operation of the RFID transmitter 314 and the RFID receiver 316 based on the clock 318, and that is further configured to interpret the RFID signals that are received by the RFID receiver 316 as RFID identifiers for the RFID tags. The RFID scanner 312 outputs RFID data 332, which can include RFID identifiers detected from nearby RFID tags along with timing information for when those RFID identifiers were detected (e.g., timestamp from clock 318 for when RFID tag identified).

The location module 322 includes a location transmitter 324 that is configured, in some instances, to transmit wireless beacon signals that are received by an array of receivers located in and around a physical space, and used to determine the location of the scanner device 310. The location module 322 can additionally and/or alternatively include a location receiver 326 that receives beacon or other signals from transmitters (e.g., BLE beacon transmitters, light-based transmitters) and uses those received signals to determine its location, such as within an indoor environment. The location module 322 further includes a clock 328 that, like the clock 318 of the RFID scanner 312, is configured to drive the timing for the transmitter 324 and the receiver 326, including the frequency with which the current location of the scanner device 310 is determined. The location module 322 further includes a location processor 330 that processes the received signals to determine the location of the scanner device 310. In instances in which the location transmitter 324 is used to transmit beacon signals to determine the location of the scanner device 310, the location processor 330 can communicate with the positioning system (e.g., indoor positing system 108) to receive the location that is determined by the positioning system based on the received/detected beacon signals form the location module 322. The location module 322 and its location processor 330 can generate location data 334, which can be provided in any of a variety of appropriate formats, such as coordinates for a coordinate system used to identify locations within an indoor space (e.g., xy coordinates).

The scanner device 310 further includes an RFID-location processor 336 that can correlate RFID data 332 with location data 334 to determine the location of RFID tags, such as within an indoor environment. As described in greater detail with regard to FIGS. 4-8, this can involve correlating RFID data 332 that can be produced at different frequencies and in differing intervals from the location data 334—meaning that there may not be a simple 1:1 correlation between RFID data 332 and location data 334. Furthermore, given the nature and range of RFID scanning technology, there may be multiple RFID-based location records for each RFID tag. The RFID-location processor 336 can determine and/or select an appropriate location for an RFID tag based on such multiple RFID records.

The RFID scanner 312 and the location module 322 can be provided as a single scanner device 310 and/or they may be parts of separate devices that are positioned/located near each other. The RFID scanner 312 can be a handheld device that a user can carry, and/or it can be mounted to or otherwise incorporated into other structures, such as carts, forklifts, drones, robots, and/or other structures that are movable. For example, the RFID scanner 312 could be embedded within a robot that is capable of autonomously traversing the aisles of a store, such as a flying drone and/or a ground-based robot.

The system 300 further includes an RFID-product database 340, similar to the database 210, which correlates products to RFID tags. The system can also include a product RFID location database 376 that is configured to store RFID-based location information for items as determined by the scanner device 310, such as the determined inventory and its locations within a retail store based on RFID scans by the scanner device 310.

The system 300 can further include a product RFID location system 370 that, in some instances, is configured to determine the location of items within an environment based on scan data from the scanner device 310. The RFID location system 370 can include a scan data processor 372 that can process and make sense of scan data, and a product RFID location data feed 374 that can publish determined locations for items, similar to the data pipeline 116. In some instances, the scanner device 310 may perform all location processing. In other instances, the scanner device 310 may perform some location data processing and the RFID location server system 370 can perform other portions of the location data processing-such as the scanner device 310 correlating RFID data instances with location instances, and the product RFID location server system 370 selecting/determining a location for each RFID tag (and corresponding product) based on multiple different scan records for the tag. Any of a variety of alternatives and configurations are possible.

The system 300 can further include systems that rely on and use the RFID location data to perform additional operations. For example, the system 300 can further include an inventory management system 350 that can track current inventory levels, for example, within a retail store. The inventory management system 350 can track, for example, on-shelf inventory 352 and backroom/stockroom inventory 354. The RFID location data stored in the database 376 and/or provided via the data feed 374 can be accessed and used by the inventory management system 350 to update the inventory 352, 354.

In another example, the system 300 can also include a store and product mapping system 360 that maps store shelves and product locations within a store, which can be used, for example, to present guidance information to workers and/or customers on mobile apps (e.g., direct workers and/or customers to location in store with particular product). The system 300 can include digital store maps 362, which define the contours and locations for shelves, aisles, and other physical structures within a retail store, and product location plans 364, which identify the location of products on the digital store maps 362. The RFID location data stored in the database 376 and/or provided via the data feed 374 can be accessed and used by the store and product mapping system 360 to update the store maps 362 and/or the update the product location plans 364.

The system 300 further includes one or more networks 302 over which the components of the system can communicate. The one or more networks 302 can include, for instance, local area networks (LANs), wide area networks (WANs), virtual private networks (VPNs), wireless networks (e.g., Wi-Fi, BLE, mobile carrier networks), wired networks (e.g., Ethernets), the internet, and/or various combinations thereof.

Figure 4:
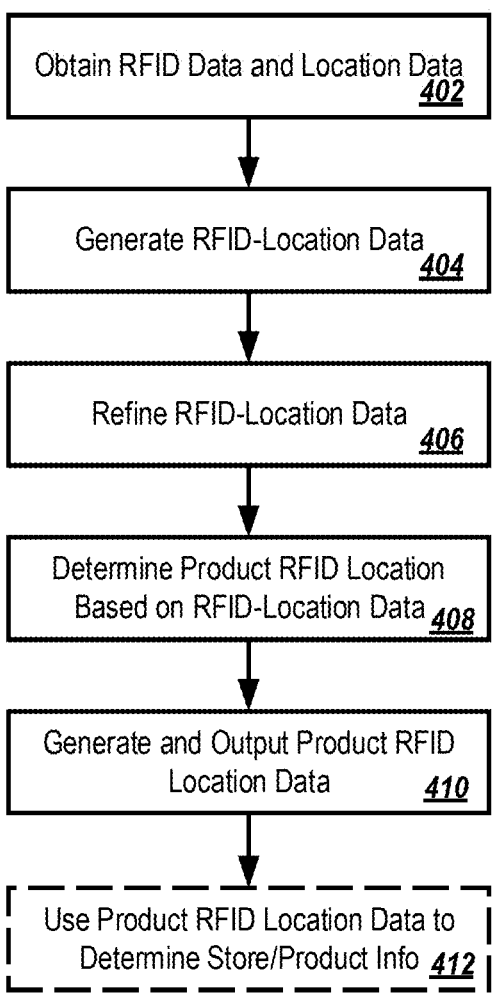
FIG. 4 is a flowchart of an example technique for generating product RFID location data using correlated RFID scans and location information.

FIG. 4 is a flowchart of an example technique 400 for generating RFID location data using correlated RFID scans and location information. The technique 400 can be performed by, for example, the components described above with regard to FIGS. 1-3, such as the scanner device 310, the product RFID location server system 370, and/or combinations thereof.

RFID data and location data can be obtained (402) and used to generate RFID-location data (404), which can correlate RFID scan data with location data. An example process for generating RFID-location data is discussed in greater detail below with regard to FIGS. 5-6. The RFID-location data may include multiple data records for each RFID tag, which may identify different locations associated with the RFID tag. As a result, the RFID-location data can be refined to identify a single location for each RFID tag (406). An example process for refining RFID-location data is described in greater detail below with regard to FIGS. 7-8.

Using the refined RFID-location data, product RFID locations can be determined (408). For example, the refined RFID identifiers in the RFID-location data can be correlated with products using, for instance, the RFID-product database 340, to generate the product RFID locations. Product RFID location data, which can be data that identifies the location of products within an indoor space (e.g., using coordinates for the indoor space), can be generated and output (410). For example, the product RFID location data can be published as part of a product RFID location data feed 374 and/or stored in a product RFID location database 376. In some implementations, the product RFID location data can be used to determine store and/or product information (412), such as determining current product locations and/or current inventory levels for a store. Such additional processing and use of the product RFID location data can be performed by other systems, such as the inventory management system 350 and/or the store and product mapping system 360.

Figure 5:
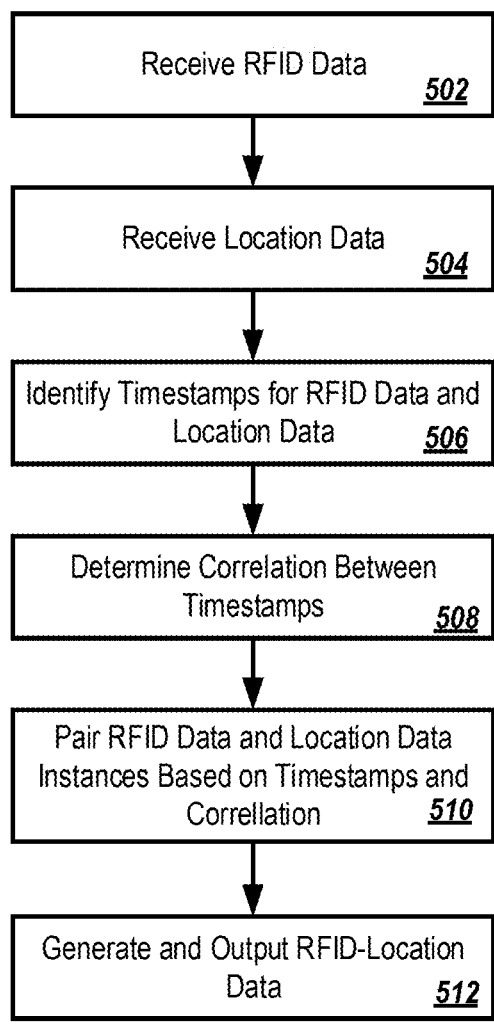
FIG. 5 is a flowchart of an example technique for correlating RFID data with location data to generate RFID-location data.
Figure 6:
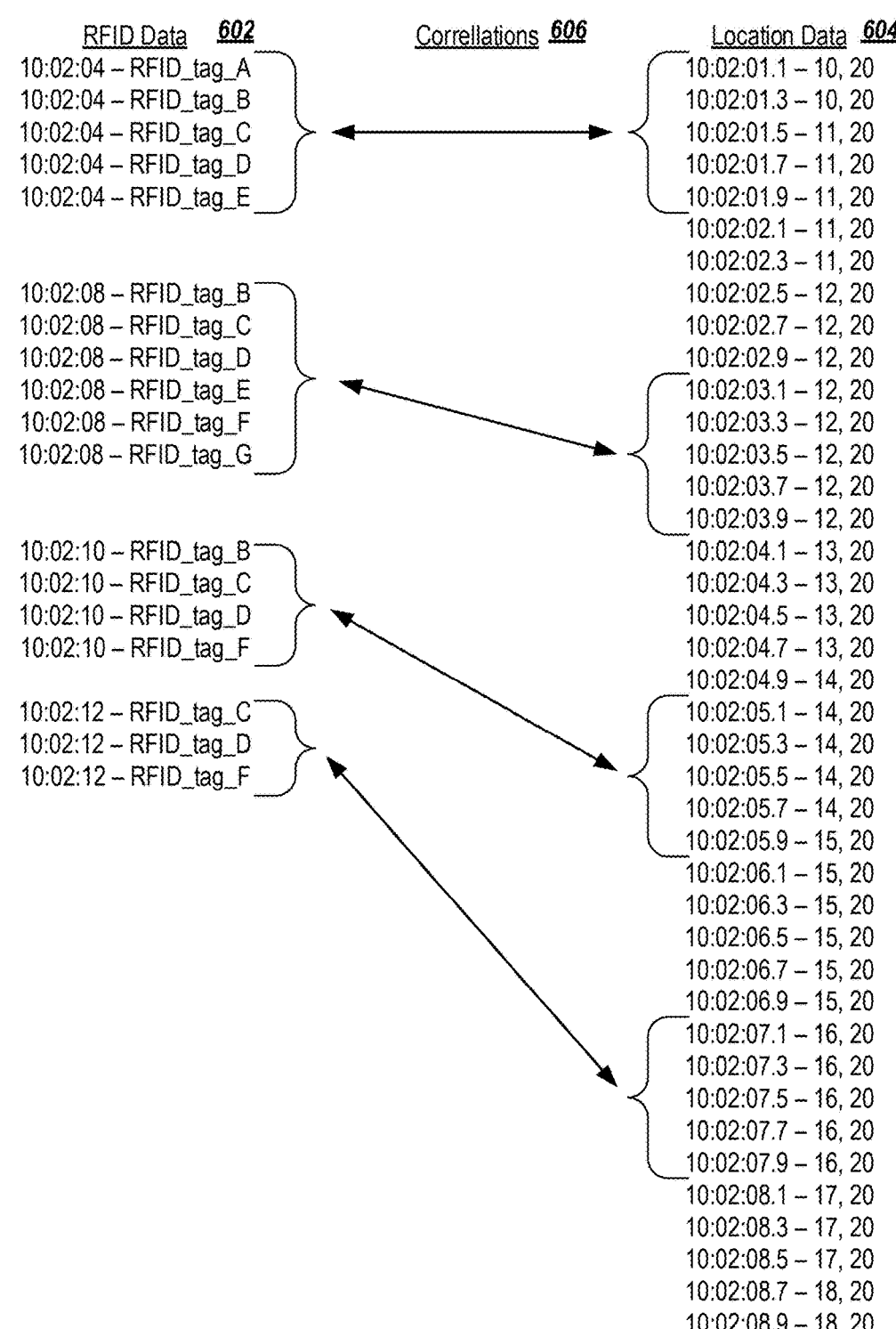
FIG. 6 depicts an illustrative example of correlations between RFID data and location data.

FIG. 5 is a flowchart of an example technique 500 for correlating RFID data with location data to generate RFID-location data. The example technique 500 can be performed as part of the technique 400 (e.g., step 404), as a standalone process, and/or as part of other processes. The technique 500 can be performed by, for example, the components described above with regard to FIGS. 1-3, such as the scanner device 310, the product RFID location server system 370, and/or combinations thereof. FIG. 6, which depicts an illustrative example 600 of correlations 606 between RFID data 602 and location data 604, is described below with regard to the example technique 500.

The RFID data can be received (502) and the location data can be received (504), and timestamps for the RFID data and the location data can be identified (506). Referring to FIG. 6, which provides a simplified example of RFID data 602 and location data 604 for illustrative purposes, the RFID data 602 can include timestamps (e.g., "10:02:04") for RFID tags ("RFID_tag_A") that are detected as part of an RFID scan. Due to the nature of RFID interactions, the RFID data 602 in this example includes multiple different RFID tags being identified at each timestamp because each RFID tag within range of an RFID interrogation signal will return its RFID identifier, which are identified in this example as "RFID_tag_A" and others. The location data 604 similarly includes timestamps that correspond to example locations (e.g., "10, 20" for indoor xy coordinate system). However, the location data 604 includes a single location for each timestamp. Additionally, the frequency for the RFID data 602 and the location data 604 in this example is different. The RFID data 602 has records occurring every two seconds, whereas the location data 604 is determined every 0.2 seconds. These are simply provided as two example frequencies, and other varied and differing frequencies may additionally and/or alternatively be used and, in some instances, the same frequency may be used.

Referring back to FIG. 5, correlations between the timestamps of the RFID data and the location data can be determined (508). For example, referring to FIG. 6, all of the RFID data instances with a timestamp "10:02:04" can be determined to be correlated with the location data instances occurring at second mark "10:02:01," which includes the five location data entries "10:02:01.1," "10:02:01.3," "10:02:01.5," "10:02:01.7," and "10:02:01.9." Other techniques for correlating the timestamps can also be used, such as identifying a single entry from the location data 604 that corresponds to the RFID data 602 (e.g., median value with range of values, mean for range of values, mode for range of value). This instance includes the clocks between the RFID data 602 and the location data 604 being out of synch (e.g., 10:02:04 in the RFID data 602 actually corresponds to 10:02:01), which can be determined by the scanner device 310 and its RFID-location processor 336 (e.g., during calibration process, based on times when the relative timing of when RFID data 332 and location data 334 is received). In some instances, the clocks for the RFID data 602 and the location data 604 can be aligned.

Referring back to FIG. 5, RFID data and location data can be paired based on the timestamps and correlations (510), and the RFID-location data can be generated and output (512). For example, referring to FIG. 6, the arrows 606 can identify pairings between the RFID data 602 and the location data 604, which can be used to generate RFID-location data entries that associate RFID tags with locations at various timestamps. When there is a simple 1:1 correlation between each of the RFID tags and location data instances (e.g., frequency with which the RFID data is generated is the same as the frequency with which the location data is generated), then the corresponding location data instance can simply be selected and associated with each of the RFID tags to provide the RFID-location data. However, when multiple location data instances occur within the time range for each RFID scan (or vice versa), then determinations can be made to identify the appropriate location data from that range for the RFID scans. For example, the location for each of the RFID scans at timestamp "10:02:04" can be determined from the five location data entries at timestamps "10:02:01.1," "10:02:01.3," "10:02:01.5," "10:02:01.7," and "10:02:01.9." Any of a variety of techniques can be used to determine the location for these RFID scans, such as using the location for median data instance (e.g., using "11, 20" from median instance 10:02:01.5) within the range (e.g., 10:02:01.1-10:02:01.9), the mean location value (e.g., "10, 20"+"10, 20"+"11, 20"+"11, 20"+"11, 20"/5=10.6, 20) for the data instances within the range (e.g., 10:02:01.1-10:02: 01.9), the mode of the location values (e.g., "11, 20") within the range (e.g., 10:02:01.1-10:02:01.9), and/or other techniques.

Figure 7:
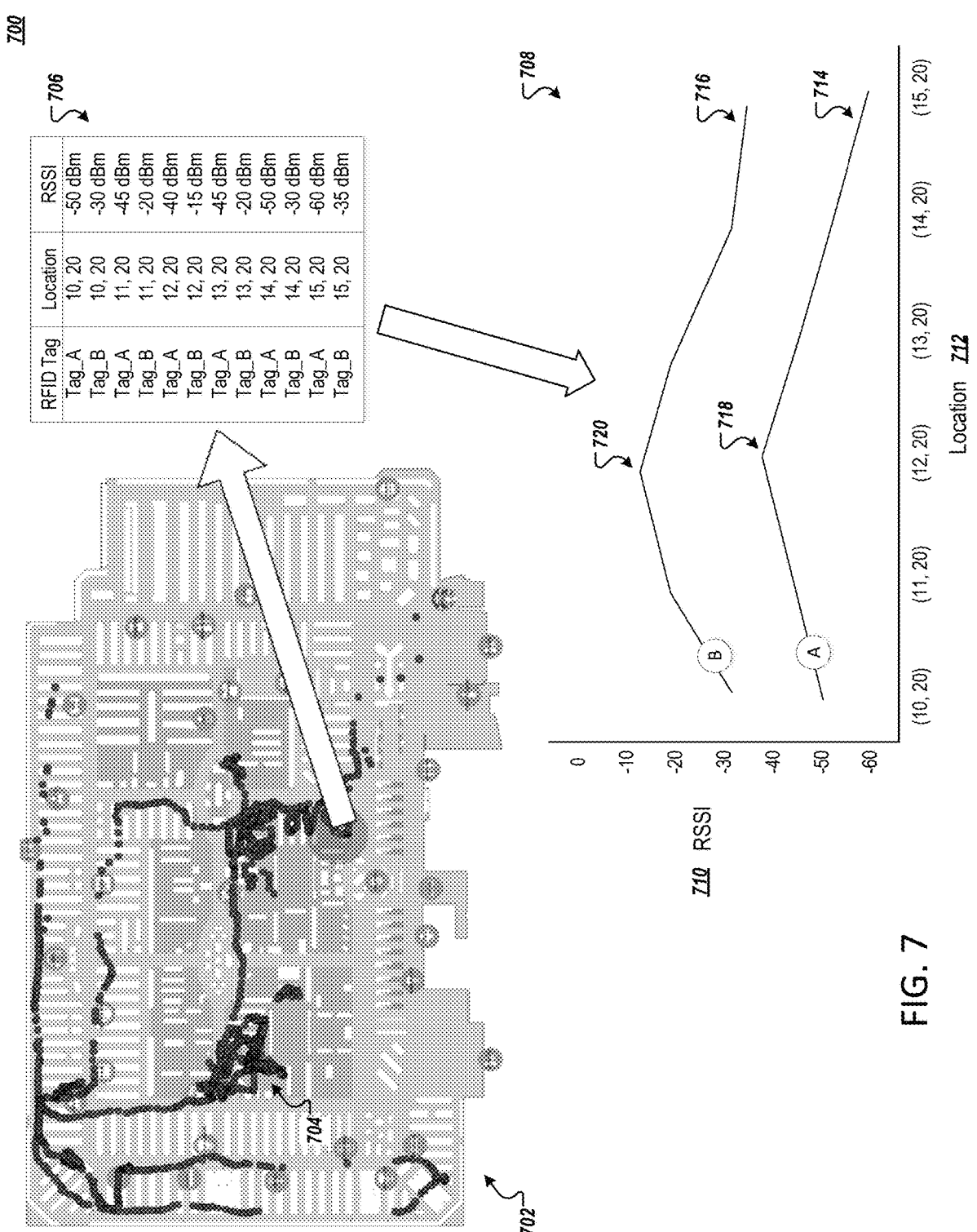
FIG. 7 is a conceptual diagram of an example system depicting RFID data scans for RFID tags mapped against signal strength.

FIG. 7 is a conceptual diagram of an example system 700 depicting RFID data scans for RFID tags mapped against signal strength. FIG. 7 is similar to the example systems 100-300 described above with regard to FIG. 1-3, but with the addition of signal strength as another aspect of the RFID scan data. FIG. 7 is described below in greater detail with regard to FIG. 8.

FIG. 8 is a flowchart of an example technique 800 for refining RFID-location data based on RFID signal strength. The example technique 800 can be performed as part of the technique 400 (e.g., step 406), as a standalone process, and/or as part of other processes. The technique 800 can be performed by, for example, the components described above with regard to FIGS. 1-3, such as the scanner device 310, the product RFID location server system 370, and/or combinations thereof.

The RFID-location data is received (802) and signal strength information is accessed (804). For example, referring to FIG. 7, example RFID scan data 706 includes RFID-location data with signal strength information (e.g., RSSI) from the RFID scans at locations 704 in an indoor environment 702. The signal strength can be the detected power of the signals transmitted by the RFID tags as detected by the RFID scanner at its location while it is scanned. A couple things to note. First, the signal strength can increase the closer the RFID scanner is to the RFID tag. Second, the signal strength for RFID tags may not be absolute, and may instead be heavily influenced by environmental factors, such as other objects located between the RFID scanner and the RFID tag, the types of materials that are in contact with the RFID tag (e.g., metal objects, plastic objects, fabrics), and/or variation in manufacturing and components contained within RFID tags. As a result, the signal strength can vary as the scanner moves past an RFID tag while recording RFID tags and location information. For example, referring to the example graph 708 that plots signal strength 710 against location 712 (in this simplified example, the scans progressed along the x-dimension in the indoor environment with the y location value remaining constant). In this example, the plot for RFID Tag_A 714 shows that the signal strength increases, peaks at location 12, 20 (718), and then drops back down. Similarly, the plot for RFID Tag_B 716 also increases, peaks at location 12, 20

(720), and then decreases. While these plots 714 and 716 follow a similar trajectory, they are shifted in terms of absolute value, with the signal strength for Tag_A being lower than Tag_B. As noted above, this may be due to any of a variety of factors, including Tag_A having environmental factors impacting its transmission and/or Tag_A being located further away than Tag_B (e.g., Tag_A located in next aisle over from Tag_B).

Referring back to FIG. 8, an RFID tag is selected (806), the RFID-location data for instances for the RFID tag are retrieved (808), the relative maximum signal strengths for the RFID tag are identified (810), and the product location is determined based on the maximum signal strengths (812). For example, referring to FIG. 7, all of the RFID-location data for Tag_A is analyzed together (in this example, Tag_A did not appear in other scan data) and a maximum signal strength at 718 is identified and the corresponding location (12, 20) can be selected as the location for Tag_A. The similar process can be performed for Tag_B, resulting in the same location being identified even though the absolute signal strength values for the tags differ. In instances where multiple locations have the same signal strength for an RFID tag (or within a threshold value of the maximum value), the location may be determined based on a combination of those locations (e.g., average/centroid of location values, median of location values, weighted average/centroid of location values based on signal strength weighting of location).

Referring back to FIG. 8, a determination about whether any other scanned RFID tags remain to have their location information determined can be made (814), and, if so, the steps 806-812 can be performed for each scanned RFID tag. If no tags remain, then the product locations for the products associated with the RFID tags can be output (816).

Figure 9:
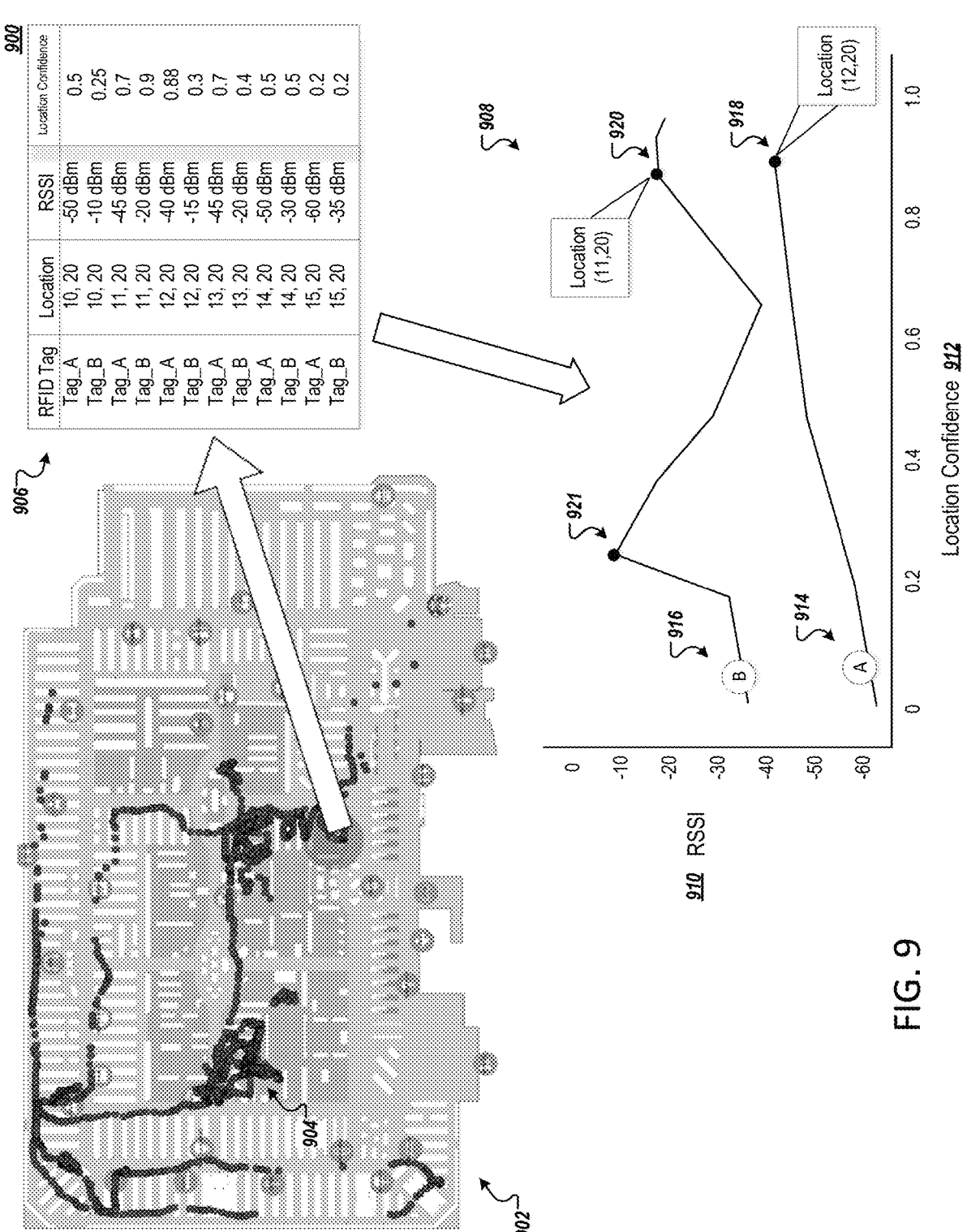
FIG. 9 is a conceptual diagram of an example system depicting RFID data scans for RFID tags mapped against signal strength and location confidence.

FIG. 9 is a conceptual diagram of an example system 900 depicting RFID data scans for RFID tags mapped against signal strength and location confidence. FIG. 9 is similar to the example system 700 described above with regard to FIGS. 7-8, but with the addition of location confidence as another aspect of the RFID scan data. FIG. 9 is described below in greater detail with regard to FIG. 10.

FIG. 10 is a flowchart of an example technique 1000 for refining RFID-location data based on RFID signal strength and location confidence. The example technique 1000 can be performed as part of the technique 400 (e.g., step 406), as a standalone process, and/or as part of other processes. The technique 1000 can be performed by, for example, the components described above with regard to FIGS. 1-3, such as the scanner device 310, the product RFID location server system 370, and/or combinations thereof.

The RFID-location data is received (1002) and signal strength information is accessed (1004). For example, referring to FIG. 9, example RFID scan data 906 includes RFID-location data with signal strength information (e.g., RSSI) from the RFID scans at locations 904 in an indoor environment 902. The signal strength can be the detected power of the signals transmitted by the RFID tags as detected by the RFID scanner at its location while it is scanned. The RFID scan data 906 also includes location confidence values, which can be determined by one or more of the components described above with regard to FIGS. 1-3 (e.g., the product RFID location server system 370). The location confidence values can indicate a confidence or likelihood that a product (e.g., item) is in a location where a scan was made or otherwise correlated with. The location confidence values can be determined in a variety of ways. For example, the location confidence values can be determined based on a radius of the location information. A location confidence value can be an inverse of a radius of a location. The location confidence value can be assigned on a predetermined scale. For example, the location confidence value can be a numeric value on a scale of 0 to 1.

Using the signal strength and location confidence as factors to select a location can provide a more holistic and accurate determination of a product location. Example graph 908 plots signal strength 910 against location confidence 912. As an illustrative example and as shown in the RFID scan data 906 and the graph 908, the signal strength for RFID Tag_B peaks at location 921 (10, 20) at −10 dBm, but this location has a low location confidence value of 0.25 (25% accuracy). The signal strength can peak at location 921, even though the location confidence is low, for a variety of reasons. For example, signal strength can be higher the closer an RFID scanner is to the RFID tag. The signal strength can also be higher depending on an angle by which the RFID scanner detects the RFID tag. If the RFID scanner is angled towards a shelf having the RFID tag, the signal strength can be higher than if the RFID scanner is angled 90 degrees from the shelf. Here, location 921 can have a high signal strength because the RFID scanner can be appropriately angled at RFID Tag_B but the confidence value can be low because the location may not be accurate. Thus, location 921 may not be selected to represent a true location of the RFID Tag_B.

Location 920 (11, 20) for RFID Tag_B, on the other hand, has a signal strength of −20 dBm and a location confidence value of 0.9 (90% accuracy). In this scenario, the location 920 (11, 20) can be selected for RFID Tag_B since this location's signal strength and location confidence are maximized in comparison to the other locations for RFID Tag_B. Although the signal strength may not be the highest among all the location points, the signal strength is relatively high in comparison to the signal strengths of the other locations and the location confidence value for the location 920 is highest among all location confidence values. Therefore, the location 920 is most likely an accurate location for the RFID Tag_B.

Referring back to FIG. 10, an RFID tag is selected (1006), the RFID-location data for instances for the RFID tag are retrieved (1008), the relative maximum signal strengths for the RFID tag are identified (1010), and the relative confidence for RFID-location data instances for the RFID tag are identified (1012). The relative confidence of the RFID-location data can be determined in a variety of ways, as described above. Position or location information from a location system in the store 902 can be detected and used in combination with the RFID-location data to generate the confidence value. The closer or more similar the position information is to the RFID-location data, the higher the confidence value. In other words, the position information can be correlated with the RFID-location data based on analyzing timestamps of each. For example, if the position information has a timestamp that is within 2 seconds of the RFID-location data, then the position information can be correlated with the RFID-location data and assigned a high confidence value. The greater a difference in time between timestamps, the lower the confidence value.

Product location can then be determined based on the relative confidence and maximum signal strengths (1014). Determining the product location can be beneficial to determine whether the product is on a sales floor in the store 902, whether the product is in an appropriate department or location on the sales floor, and/or a quantity of the product available on the sales floor. Determining this information can be beneficial to improve in-store replenishment so that low-stock products can be efficiently and quickly replenished on the sales floor. Moreover, determining the product location can be beneficial to generate information for relevant users about where to place the product on the sales floor when completing replenishment and/or fulfillment tasks in the store 902.

As an illustrative example, referring to FIG. 9, all of the RFID-location data for Tag_B is analyzed together (in this example, Tag_B did not appear in other scan data), a maximum signal strength of −15 dBm at location (12, 20) may be identified but the location only has a confidence value of 30%. Therefore, a next maximum signal strength of −20 dBm at location (11, 20) is identified, which has the highest confidence value of 90%. The location (11, 20) can therefore be selected as the location for Tag_B. The similar process can be performed for Tag_A, resulting in location (12, 20) being identified since the location accuracy is 88% and the absolute signal strength is also the lowest for the Tag_A.

Referring back to FIG. 10, a determination about whether any other scanned RFID tags remain to have their location information determined can be made (1016), and, if so, the steps 1006-1014 can be performed for each scanned RFID tag. If no tags remain, then the product locations for the products associated with the RFID tags can be outputted (1018).

Figure 11:
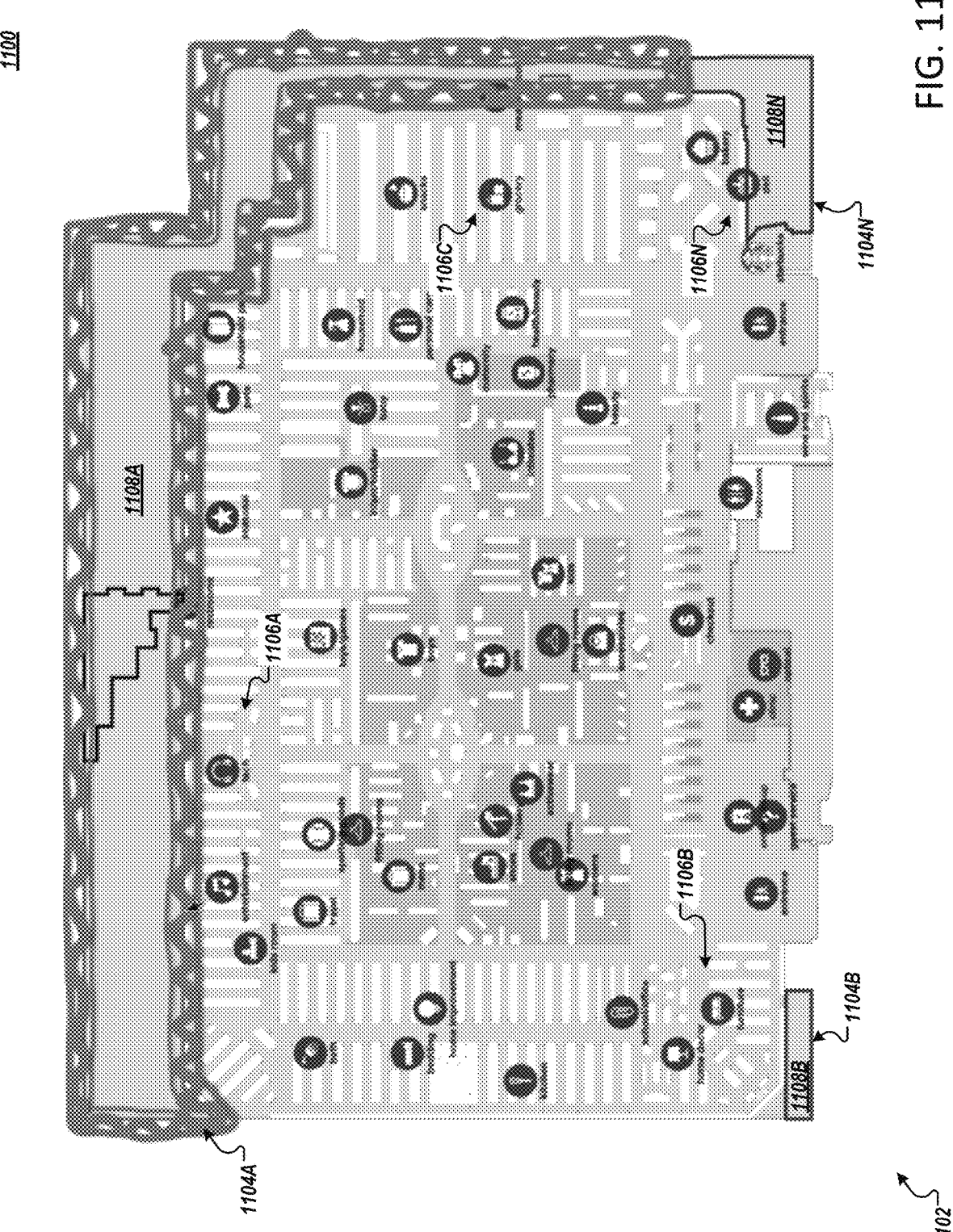
FIG. 11 is a conceptual diagram of an example system for providing RFID-based location tracking for items in an indoor environment.

FIG. 11 is a conceptual diagram of an example system 1100 for providing RFID-based location tracking for items in an indoor environment. The example system 200 can be similar to the systems 100, 200, 700, 800, 900, and 1000, and can be implemented by some, all, and/or other components described herein.

The system 1100 depicts a physical indoor environment that, in this example, is a retail store 1102 that includes a variety of RFID-tagged items located within the store 1102. The store 1102 can include a variety of departments 1106A-N on a sales floor of the store 1102. The departments 1106A-N can include but are not limited to technology (1106A), furniture (1106B), grocery (1106C), and deli (1106N). The store 1102 can also include stock rooms 1108A-N, which can include backroom storage areas (1108A) and/or front room storage areas (1108B, 1108N). In some implementations, one or more stock rooms can be positioned on the sales floor of the store 1102, such as in a center of the store 1102. One or more stock rooms can also be positioned adjacent to any of the departments 1106A-N in the store 1102.

Buffers 1104A-N can be established between the departments 1106A-N on the sales floor in the store 1102 and the stock rooms 1108A-N. The buffers 1104A-N can, for example, be established around/surrounding each of the stock rooms 1108A-N. The buffers 1108A-N can create a boundary between the departments 1106A-N and the stock rooms 1108A-N.

The disclosed techniques can be used to determine, with increased accuracy, whether products are on the sales floor in the departments 1106A-N. RFID scan data that is generated based on location-correlated RFID scans within the buffers 1104A-N may be ignored since these scans can represent either products in the stock rooms 1108A-N or products in the departments 1106A-N. Ignoring these scans can include discarding data (e.g., RFID scan data) that is collected from these scans. Instead of ignoring this RFID scan data, the RFID scan data can be assigned a low location confidence value because it is uncertain whether the scan originated from a product in one of the departments 1106A-N on the sales floor or a product in a backroom, such as the stock room 1108A.

Similarly, RFID scan data can be generated based on scanning each of the stock rooms 1108A-N to determine what products are in the stock rooms 1108A-N (and/or quantities of the products in the stock rooms 1108A-N). RFID scan data that is generated from scans that fall within the buffers 1104A-N in the stock rooms 1108A-N can be ignored/discarded or otherwise assigned a low location confidence value. In implementations where a stock room is in a center of the store 1102, buffers can be established around each wall of the stock room and any scans that are made within those buffers in the store 1102 can be ignored or assigned a low location confidence value.

The buffers 1104A-N can be used to discard RFID scan data in the processes described herein, such as the processes 500, 800 and 1000 in FIGS. 5, 8, and 10, respectively. For example, in the process 500 in FIG. 5, an additional step can be performed blocks 504 and 506 in which the computer system can determine whether the either the RFID data or the location data falls within the buffers 1104A-N. If either of the data is within the buffers 1104A-N, the computer system can discard that data and return to block 502 and continue to receive data. If the data is not within the buffers 1104A-N, then the computer system can proceed to block 506 and continue through the process 500. In the process 800 in FIG. 8, for example, an additional step can be performed between blocks 802 and 804, 804 and 806, and/or 806 and 808. In the additional step, the computer system can determine whether the RFID-location data falls within the buffers 1104A-N. If the data is within the buffers 1104A-N, the computer system can return to block 802 and receive data. If the data is not within the buffers 1104A-N, then the computer system can proceed through the process 800 as described above. Similarly, in the process 1000 in FIG. 10, an additional step can be performed between blocks 1002 and 1004, 1004 and 1006, and/or 1006 and 1008. In the additional step, the computer system can determine whether the RFID-location data falls within the buffers 1104A-N. If the data is within the buffers 1104A-N, the computer system can return to block 1002 and receive data. If the data is not within the buffers 1104A-N, then the computer system can proceed through the process 1000 as described above.

Figure 12:
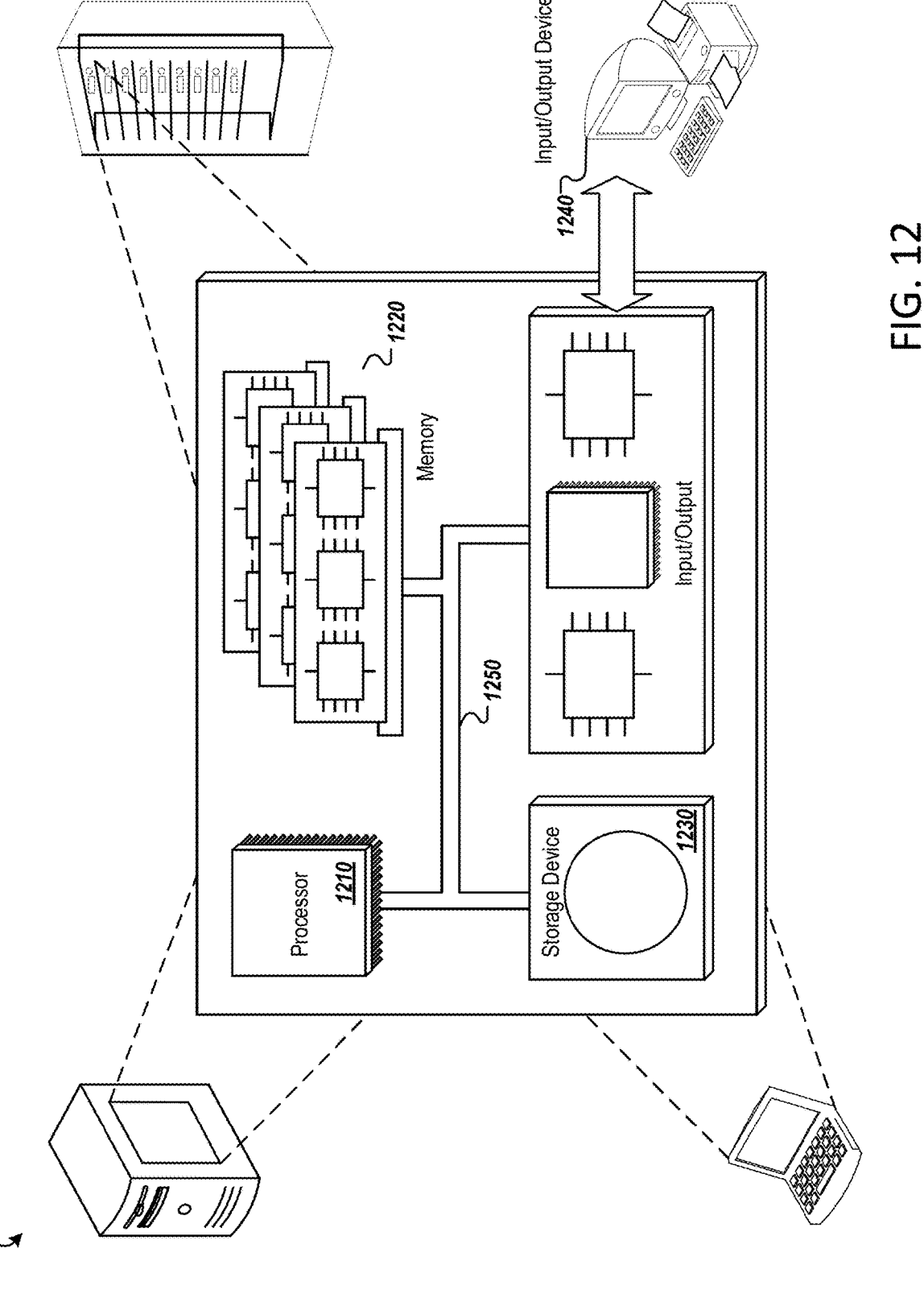
FIG. 12 is a block diagram of computing devices that may be used to implement the systems and methods described in this document.

FIG. 12 is a schematic diagram that shows an example of a computing system 1200. The computing system 1200 can be used for some or all of the operations described previously, according to some implementations. The computing system 1200 includes a processor 1210, a memory 1220, a storage device 1230, and an input/output device 1240. Each of the processor 1210, the memory 1220, the storage device 1230, and the input/output device 1240 are interconnected using a system bus 1250. The processor 1210 is capable of processing instructions for execution within the computing system 1200. In some implementations, the processor 1210 is a single-threaded processor. In some implementations, the processor 1210 is a multi-threaded processor. The processor 1210 is capable of processing instructions stored in the memory 1220 or on the storage device 1230 to display graphical information for a user interface on the input/output device 1240.

The memory 1220 stores information within the computing system 1200. In some implementations, the memory 1220 is a computer-readable medium. In some implementations, the memory 1220 is a volatile memory unit. In some implementations, the memory 1220 is a non-volatile memory unit.

The storage device 1230 is capable of providing mass storage for the computing system 1200. In some implementations, the storage device 1230 is a computer-readable medium. In various different implementations, the storage device 1230 may be a floppy disk device, a hard disk device, an optical disk device, or a tape device.

The input/output device 1240 provides input/output operations for the computing system 1200. In some implementations, the input/output device 1240 includes a keyboard and/or pointing device. In some implementations, the input/output device 1240 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A method for providing RFID-based locations for items located in an indoor environment, the method comprising:

receiving RFID data, wherein the RFID data comprises (i) a plurality of signal strength readings for each of a plurality of RFID identifiers at different locations in an indoor environment and (ii) time series data for each of the plurality of RFID identifiers, wherein the time series data is generated from a scanning device being physically moved around different locations near the RFID identifier over a period of time;

obtaining RFID-location data correlating portions of the RFID data with the locations of each of the plurality of RFID identifiers in the indoor environment, wherein the RFID-location data comprises the different locations of the scanning device as the scanning device is being physically moved around the indoor environment;

determining, for each of the RFID identifiers and based on the RFID data and the RFID-location data, location confidence values indicating a likelihood that an item is in a location based on a combination of (i) determining an inverse of a radius of the location associated with the RFID data and (ii) identifying timestamps of the time series data being within a threshold amount of time of timestamps of the RFID-location data, wherein determining, for each of the RFID identifiers, the location confidence values further comprises assigning a lower location confidence value in response to determining that the RFID-location data is associated with a location in a predefined buffer region of the indoor environment and assigning a higher location confidence value in response to determining that the RFID-location data is associated with a location outside of the predefined buffer region of the indoor environment;

determining a current location of the item in the indoor environment based on:

accessing the location confidence values, identifying one or more RFID identifiers amongst the RFID identifiers having an optimal combination of a maximum signal strength and a maximum location confidence value based on (i) identifying the maximum signal strength that exceeds a threshold confidence range relative to other signal strengths in the time series data and (ii) identifying the maximum location confidence value that is highest relative to other location confidence values amongst the location confidence values, and determining the current location of the item based on correlating the selected one or more RFID identifiers with items in a RFID-items database; and returning information about the current location of the item in the indoor environment.

2. The method of claim 1, wherein, in response to identifying multiple locations having a signal strength within a threshold value of a maximum signal strength value, determining the current location comprises determining a centroid location value amongst the multiple locations as the current location.

3. The method of claim 1, wherein, in response to identifying multiple locations having a signal strength within a threshold value of a maximum signal strength value, determining the current location comprises determining an average location value amongst the multiple locations as the current location.

4. The method of claim 1, wherein, in response to identifying multiple locations having a signal strength within a threshold value of a maximum signal strength value, determining the current location comprises determining a median location value amongst the multiple locations as the current location.

5. The method of claim 1, wherein determining the location confidence values comprises determining a radius of the locations associated with the RFID-location data.

6. The method of claim 1, wherein the returned information comprises placement of the item on a sales floor in the indoor environment for replenishment tasks or fulfillment tasks in the indoor environment.

7. The method of claim 1, wherein the returned information comprises an indication of whether the item is located in a corresponding department on a sales floor in the indoor environment.

8. The method of claim 1, wherein the returned information comprises an indication of a quantity of the item that is on a sales floor in the indoor environment.

9. The method of claim 1, wherein the method further comprises:

generating an item map for a sales floor in the indoor environment based at least in part on the RFID-location data; and returning the item map for the sales floor in the indoor environment.

10. The method of claim 1, wherein the method further comprises:

retrieving, from the RFID-items database, RFID-item data, wherein the RFID-item data correlates each of the plurality of RFID identifiers with a plurality of items in the indoor environment;

determining a quantity that each of the plurality of items is identified in locations in the indoor environment based on correlating the item in the plurality of items in the RFID-item data with instances that the RFID identifier are identified in the RFID-location data; and returning the quantity for each of the plurality of items identified in the indoor environment.

11. The method of claim 10, wherein the method further comprises:

identifying a first quantity that each of the plurality of items is identified in the indoor environment;

identifying a second quantity that the item is identified in the indoor environment;

determining that the second quantity of the item is greater than the first quantity of the item;

determining that the second quantity of the item is in an expected location for the item based on a determination that the second quantity of the item is greater than the first quantity of the item; and returning information indicating that the first quantity of the item should be moved to the expected location for the item.

12. The method of claim 10, wherein returning the quantity for each of the plurality of items identified in the indoor environment comprises:

determining whether the quantity for the item is within a threshold stock level for the item; and returning information indicating that the item is low in stock based on the quantity of the item being less than the threshold stock level.

13. The method of claim 1, wherein the predefined buffer region is a stock room and the indoor environment is a physical retail environment.

14. A system for providing RFID-based locations for items located in an indoor environment, the system comprising:

a scanner device comprising an RFID scanner and a location module, wherein the scanner device is configured to generate RFID data as the scanner device is being moved around different locations near a plurality of RFID identifiers in an indoor environment over a period of time, wherein the RFID data comprises (i) a plurality of signal strength readings for each of the plurality of RFID identifiers at the different locations in the indoor environment and (ii) time series data for each of the plurality of RFID identifiers;

a data store configured to maintain RFID-location data correlating portions of the RFID data with the locations of each of the plurality of RFID identifiers in the indoor environment;

a server system in network communication with the scanner device and the data store, wherein the server system is configured to perform a process comprising:

receiving the RFID data from the scanner device;

obtaining the RFID-location data from the data store;

determining, for each of the RFID identifiers and based on the RFID data and the RFID-location data, location confidence values indicating a likelihood that an item is in a location based on a combination of (i) determining an inverse of a radius of the location associated with the RFID data and (ii) identifying timestamps of the time series data being within a threshold amount of time of timestamps of the RFID-location data, wherein determining, for each of the RFID identifiers, the location confidence values further comprises assigning a lower location confidence value in response to determining that the RFID-location data is associated with a location in a predefined buffer region of the indoor environment and assigning a higher location confidence value in response to determining that the RFID-location data is associated with a location outside of the predefined buffer region of the indoor environment;

determining a current location of the item in the indoor environment based on:

accessing the location confidence values, identifying one or more RFID identifiers amongst the RFID identifiers having an optimal combination of a maximum signal strength and a maximum location confidence value based on (i) identifying the maximum signal strength that exceeds a threshold confidence range relative to other signal strengths in the time series data and (ii) identifying the maximum location confidence value that is highest relative to other location confidence values amongst the location confidence values, and determining the current location of the item based on correlating the selected one or more RFID identifiers with items in a RFID-items database; and returning information about the current location of the item in the indoor environment.

15. The system of claim 14, wherein the RFID scanner of the scanner device is configured to generate a first portion of the RFID data and the location module of the scanner device is configured to generate a second portion of the RFID data, the first portion comprising RFID information and the second portion comprising location information, wherein the RFID scanner comprises a handheld device or a device that is mounted to a movable structure in the indoor environment.

16. The system of claim 15, wherein the scanner device further comprises an RFID-location processor that is configured to generate the RFID-location data based on correlating the RFID information from the RFID scanner with the location information from the location module.

17. The system of claim 14, wherein the process further comprises:

correlating the items with the RFID data and the RFID-location data;

determining a quantity of each of the items based on the correlating;

determining a location of each of the items based on the correlating; and returning information about the items in the indoor environment, wherein the returned information comprises at least one of the quantity of each of the items and the location of each of the items.

18. The system of claim 17, wherein the system further comprises a location system that is configured to determine locations of the items in the indoor environment, wherein the location system is configured to perform a process comprising: the correlating, the determining, the determining, and the returning.

19. The system of claim 14, the system further comprising:

an inventory management system configured to iteratively determine inventory levels for the items in the indoor environment based on processing the RFID-location data, wherein the inventory management system is further configured to determine on-shelf inventory for the items in the indoor environment and backroom inventory for the items in the indoor environment.

20. The system of claim 14, the system further comprising:

a mapping system that is configured to generate maps of the indoor environment based on processing the RFID-location data, wherein the maps include at least shelves, aisles, physical structures, and locations of the items in the indoor environment, wherein the mapping system is further configured to:

generate, based on the maps, guidance information for relevant users in the indoor environment to travel to one or more of the items in the indoor environment; and return the guidance information to devices of the relevant users for presentation in respective graphical user interface (GUI) displays.

\* \* \* \* \*